United States Patent
Tsunekawa et al.

(10) Patent No.: US 7,929,611 B2
(45) Date of Patent: Apr. 19, 2011

(54) FRAME RATE CONVERTING APPARATUS, PAN/TILT DETERMINING APPARATUS, AND VIDEO APPARATUS

(75) Inventors: Norikazu Tsunekawa, Hirakata (JP); Akihiro Maenaka, Kadoma (JP); Yukio Mori, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 1425 days.

(21) Appl. No.: 11/386,682

(22) Filed: Mar. 23, 2006

(65) Prior Publication Data
US 2006/0215037 A1    Sep. 28, 2006

(30) Foreign Application Priority Data

Mar. 25, 2005  (JP) ................. 2005-089257
Feb. 22, 2006  (JP) ................. 2006-045721

(51) Int. Cl.
*H04N 7/12* (2006.01)
*H04N 11/02* (2006.01)
*H04N 11/04* (2006.01)
*H04B 1/66* (2006.01)

(52) U.S. Cl. .......... 375/240.16; 375/240.01; 375/240.08
(58) Field of Classification Search .................. 375/229, 375/230
See application file for complete search history.

(56) References Cited

U.S. PATENT DOCUMENTS

| | | | |
|---|---|---|---|
| 4,779,131 A | 10/1988 | Matsumoto et al. | |
| 5,648,815 A | 7/1997 | Toba | |
| 6,215,519 B1* | 4/2001 | Nayar et al. | 348/159 |
| 7,565,003 B2* | 7/2009 | Ashizaki et al. | 382/154 |
| 2004/0101058 A1* | 5/2004 | Sasai et al. | 375/240.26 |
| 2004/0109059 A1* | 6/2004 | Kawakita | 348/143 |
| 2004/0179594 A1* | 9/2004 | Biswas et al. | 375/240.2 |
| 2004/0215689 A1* | 10/2004 | Dooley et al. | 709/200 |

(Continued)

FOREIGN PATENT DOCUMENTS
JP    61107886    5/1986
(Continued)

OTHER PUBLICATIONS

Notice of Rejection from corresponding Japanese case, dated Dec. 10, 2009.

*Primary Examiner* — David C Payne
*Assistant Examiner* — Erin M File
(74) *Attorney, Agent, or Firm* — NDQ&M Watchstone LLP

(57) ABSTRACT

A frame rate converting apparatus includes a pan/tilt determining unit which determines whether an image is in a pan/tilt state on the basis of information related to motion of the image detected by a motion detecting unit for each frame of a moving image, a moving distance setting unit which sets 0 as a moving distance of an image with respect to a frame the image of which is not determined as an image in a pan/tilt state by the pan/tilt determining unit, which calculates a moving distance of an image from the information related to the motion of the image detected by the motion detecting unit with respect to a frame the image of which is determined as an image in a pan/tilt state, and which sets the obtained moving distance as a moving distance of the image, and a prediction image generating unit which generates a prediction image necessary for frame rate conversion on the basis of the moving distance of the image set for each frame by the moving distance setting unit.

14 Claims, 14 Drawing Sheets

U.S. PATENT DOCUMENTS

| | | |
|---|---|---|
| 2004/0218828 A1* | 11/2004 | Aiso .............................. 382/254 |
| 2006/0187305 A1* | 8/2006 | Trivedi et al. ................. 348/169 |

FOREIGN PATENT DOCUMENTS

| | | |
|---|---|---|
| JP | 61269475 | 11/1986 |
| JP | 562876 | 9/1993 |
| JP | 5252486 | 9/1993 |
| JP | 783469 | 9/1995 |
| JP | 09-200770 | 7/1997 |
| JP | 9252425 | 9/1997 |
| JP | 11177940 | 7/1999 |
| JP | 2944369 | 9/1999 |
| JP | 3416378 | 6/2003 |
| JP | 2003-069961 | 7/2003 |

\* cited by examiner

——— : WRITING IN MEMORY
- - - - - - : READING FROM MEMORY

FIG. 9
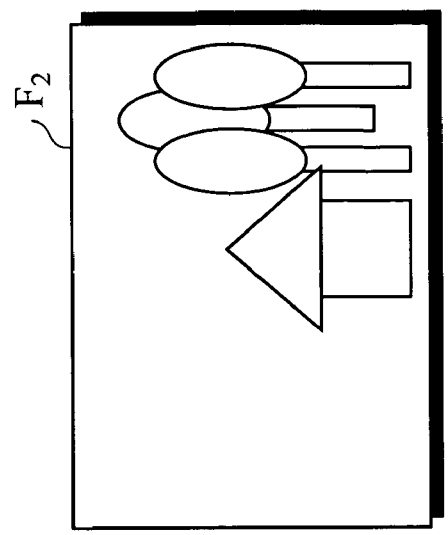
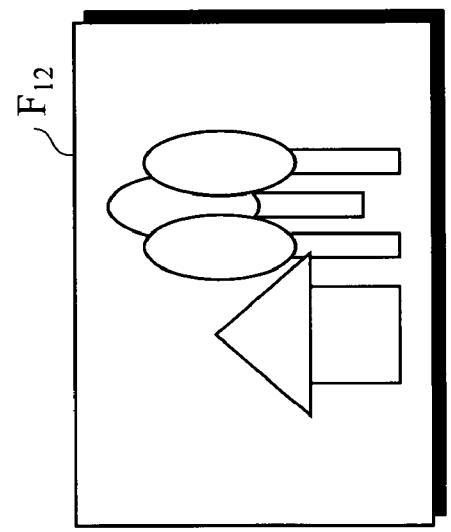
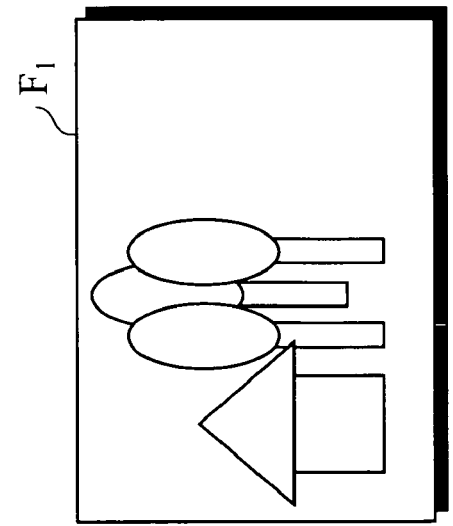

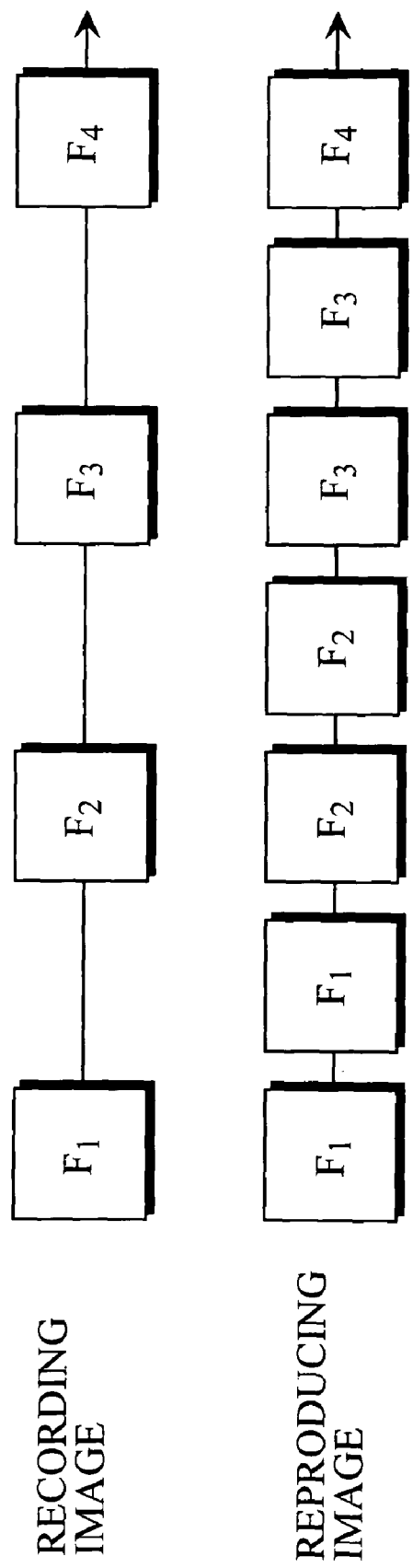

FRAME RATE CONVERTING APPARATUS, PAN/TILT DETERMINING APPARATUS, AND VIDEO APPARATUS

BACKGROUND OF THE INVENTION

1. Field of the Invention

The present invention relates to a frame rate converting apparatus to convert a frame rate of a moving image, a pan/tilt determining apparatus which determines whether an image is in a pan/tilt state, a video apparatus having a frame rate converting apparatus, and a video apparatus having a pan/tilt determining apparatus. In this case, the video apparatus includes a digital camera, a video camera, a television receiver, and the like.

2. Description of the Related Art

For example, a moving image is picked up by a digital camera, a frame rate of a recording image recorded on a recording medium is 30 frames/second, and a frame rate of a reproducing image is 60 frames/second. For this reason, when the reproducing image is generated from the recording image, a frame rate converting process.

As a conventional frame rate converting method, as shown in FIG. 15, a method of inverting an early frame of adjacent frames of a recording image is inserted between the adjacent frames. In addition, a method of inserting a predicted screen between the adjacent frames of the recording image is developed (see Japanese Unexamined Patent Publication No. 9-200770 and Japanese Unexamined Patent Publication No. 2003-69961). However, in a conventional art, since the frame rate is converted without considering whether the image is in a pan/tilt state, it is disadvantageous that a smooth reproducing image cannot be obtained.

SUMMARY OF THE INVENTION

It is an object of the present invention to provide a frame rate converting apparatus which can obtain a smooth reproducing image.

It is another object of the present invention to provide a video apparatus having a frame rate converting apparatus which can obtain a smooth reproducing image.

It is still another object of the present invention to provide a pan/tilt determining apparatus which can determine whether an image is in a pan/tilt state.

It is still another object of the present invention to provide a video apparatus having a pan/tilt determining apparatus.

It is still another object of the present invention to provide a frame rate converting apparatus which can generate a prediction image without generating a blank portion.

It is still another object of the present invention to provide a video apparatus having a frame rate converting apparatus which can generate a prediction image without generating a blank portion.

According to the present invention, there is provided a first frame rate converting apparatus which converts a frame rate of a moving image, including: motion detecting means which detects information related to motion of an image for each frame of a moving image to be converted; pan/tilt determining means which determines whether the image is in a pan/tilt state on the basis of the information related to the motion of the image detected by the motion detecting means for each frame of the moving image to be converted; moving distance setting means which sets 0 as a moving distance of an image with respect to a frame the image of which is not determined as an image in a pan/tilt state by the pan/tilt determining means, which calculates a moving distance of an image from the information related to the motion of the image detected by the motion detecting means with respect to a frame the image of which is determined as an image in a pan/tilt state, and which sets the obtained moving distance as a moving distance of the image; and prediction image generating means which generates a prediction image necessary for frame rate conversion on the basis of the moving distance of the image set for each frame by the moving distance setting means.

According to the present invention, there is provided a second frame rate converting apparatus which converts a frame rate of a moving image, including: motion detecting means which detects information related to motion of an image for each frame of a moving image to be converted; pan/tilt determining means which determines whether the image is in a pan/tilt state on the basis of the information related to the motion of the image detected by the motion detecting means for each frame of the moving image to be converted; moving distance setting means which sets 0 as a moving distance of an image with respect to a frame the image of which is not determined as an image in a pan/tilt state by the pan/tilt determining means, which calculates a moving distance of an image from the information related to the motion of the image detected by the motion detecting means with respect to a frame the image of which is determined as an image in a pan/tilt state, and which sets the obtained moving distance as a moving distance of the image; time-direction smoothing means which smoothes the moving distance of the image set for each frame by the moving distance setting means in a direction of time; and prediction image generating means which generates a prediction image necessary for frame rate conversion on the basis of the moving distance of the image obtained by the time-direction smoothing means.

In the first or second frame rate converting apparatus, used as the motion detecting means is, for example, means which calculates a motion vector, a minimum value of correlative accumulated values, and an average value of the correlative accumulated values as information related to the motion of the image for each of a plurality of motion vector detecting regions set in a video area of each frame by a typical point matching method, and, used as the pan/tilt determining means is, for example, means having means which specifies a region in which the detected motion vector has high reliability of the motion vector detecting regions on the basis of the average value of the correlative accumulated values detected for each of the motion vector detecting regions and which calculates the number of detection regions in which the detected motion vectors have high reliability, means which determines whether the number of detection regions in which the detected motion vectors have high reliability is not less than a first threshold value, means which, when the number of detection regions in which the detected moving vectors have high reliability is less than the first threshold value, determines that the frame is not panned/tilted, means which, when the number of detected regions in which the detected motion vectors have high reliability is not less than the first threshold value, specifies a detection region in which motions of a plurality of types are present and a detection region in which motions of a plurality of types are not present in the detection regions in which the motion vectors have high reliability on the basis of an average value of correlative accumulated values detected for the detection regions in which the motion vectors have high reliability and a minimum value of the correlative accumulated values, and which calculates the number of detection regions in which the motions of the plurality of types are present, means which determines whether the number of detection regions in which the motions of the plurality of types are present is less than a second threshold value, means which, when the number of detection regions in which the motions of the plurality of types are present is not less than the second threshold value, determines that the frame is not panned/tilted, and means which, when the number of detection regions in which the motions of the plurality of types are present is less than the second threshold value, determines that the frame is panned/tilted.

In the first or second frame rate converting apparatus, used as the motion detecting means is, for example, means which calculates a motion vector, a minimum value of correlative accumulated values, and an average value of the correlative accumulated values as information related to the motion of the image for each of a plurality of motion vector detecting regions set in a video area of each frame by a typical point matching method, and, used as the pan/tilt determining means is, for example, means having means which specifies a region in which the detected motion vector has high reliability of the motion vector detecting regions on the basis of the average value of the correlative accumulated values detected for each of the motion vector detecting regions and which calculates the number of detection regions in which the detected motion vectors have high reliability, means which determines whether the number of detection regions in which the detected motion vectors have high reliability is not less than a first threshold value, means which, when the number of detection regions in which the detected moving vectors have high reliability is less than the first threshold value, determines that the frame is not panned/tilted, means which, when the number of detection regions in which the detected motion vectors have high reliability is not less than the first threshold value, specifies a detection region in which motions of a plurality of types are present and a detection region in which motions of a plurality of types are not present in the detection regions in which the motion vectors have high reliability on the basis of an average value of correlative accumulated values detected for the detection regions in which the motion vectors have high reliability and a minimum value of the correlative accumulated values, and which calculates the number of detection regions in which the motions of the plurality of types are present, means which determines whether the number of detection regions in which the motions of the plurality of types are present is less than a second threshold value, means which, when the number of detection regions in which the motions of the plurality of types are present is not less than the second threshold value, determines that the frame is not panned/tilted, means which, when the number of detection regions in which the motions of the plurality of types are present is less than the second threshold value, specifies detection regions in which motion vectors have similarity in the detection regions in which the motion vectors have high reliability and the motions of the plurality of types are not present on the basis of a motion vector detected for the detection region in which the motion vector has high reliability and the motions of the plurality of types are not present, and which calculates the number of detection regions in which motion vectors have similarity, means which determines whether the number of detection regions in which motion vectors have similarity is not less than a third threshold value, means which, when the number of detection regions which are determined as detection regions in which the motion vectors have similarity is less than the third threshold value, determines that the frame is not panned/tilted, and means which, when the number of detection regions which are determined as detection regions in which the motion vectors have similarity is not less than the third threshold value, determines that the frame is panned/tilted.

According to the present invention, there is provided a first video apparatus having a frame rate converting apparatus which converts a frame rate of a moving image, wherein the frame rate converting apparatus includes: motion detecting means which detects information related to motion of an image for each frame of a moving image to be converted; pan/tilt determining means which determines whether the image is in a pan/tilt state on the basis of the information related to the motion of the image detected by the motion detecting means for each frame of the moving image to be converted; moving distance setting means which sets 0 as a moving distance of an image with respect to a frame the image of which is not determined as an image in a pan/tilt state by the pan/tilt determining means, which calculates a moving distance of an image from the information related to the motion of the image detected by the motion detecting means with respect to a frame the image of which is determined as an image in a pan/tilt state, and which sets the obtained moving distance as a moving distance of the image; and prediction image generating means which generates a prediction image necessary for frame rate conversion on the basis of the moving distance of the image set for each frame by the moving distance setting means.

According to the present invention, there is provided a second video apparatus having a frame rate converting apparatus which converts a frame rate of a moving image, wherein the frame rate converting apparatus includes: motion detecting means which detects information related to motion of an image for each frame of a moving image to be converted; pan/tilt determining means which determines whether the image is in a pan/tilt state on the basis of the information related to the motion of the image detected by the motion detecting means for each frame of the moving image to be converted; moving distance setting means which sets 0 as a moving distance of an image with respect to a frame the image of which is not determined as an image in a pan/tilt state by the pan/tilt determining means, which calculates a moving distance of an image from the information related to the motion of the image detected by the motion detecting means with respect to a frame the image of which is determined as an image in a pan/tilt state, and which sets the obtained moving distance as a moving distance of the image; time-direction smoothing means which smoothes the moving distance of the image set for each frame by the moving distance setting means in a direction of time; and prediction image generating means which generates a prediction image necessary for frame rate conversion on the basis of the moving distance of the image obtained by the time-direction smoothing means.

According to the present invention, there is provided a first pan/tilt determining apparatus which determines whether an image is in a pan/tilt state for each frame of a moving image, including: means which calculates a motion vector, a minimum value of correlative accumulated values, and an average value of the correlative accumulated values for each of a plurality of motion vector detecting regions set in a video area of each frame of a moving image by a typical point matching method; means which specifies a region in which the detected motion vector has high reliability of the motion vector detecting regions on the basis of the average value of the correlative accumulated values detected for each of the motion vector detecting regions and which calculates the number of detection regions in which the detected motion vectors have high reliability; means which determines whether the number of detection regions in which the detected motion vectors have high reliability is not less than a first threshold value; means which, when the number of detection regions in which the detected moving vectors have high reliability is less than the first threshold value, determines that the frame is not panned/tilted; means which, when the number of detection regions in which the detected motion vectors have high reliability is not less than the first threshold value, specifies a detection region in which motions of a plurality of types are present and a detection region in which motions of a plurality of types are not present in the detection regions in which the motion vectors have high reliability on the basis of an average value of correlative accumulated values detected for the detection regions in which the motion vectors have high reliability and a minimum value of the correlative accumulated values, and which calculates the number of detection regions in which the motions of the plurality of types are present; means which determines whether the number of detection regions in which the motions of the plurality of types are present is less than a second threshold value; means which, when the number of detection regions in which the motions of the plurality of types are present is not less than the second threshold value, determines that the frame is not panned/tilted; and means which, when the number of detection regions in which the motions of the plurality of types are present is less than the second threshold value, determines that the frame is panned/tilted.

According to the present invention, there is provided a second pan/tilt determining apparatus which determines whether an image is in a pan/tilt state for each frame of a moving image, including: means which calculates a motion vector, a minimum value of correlative accumulated values, and an average value of the correlative accumulated values for each of a plurality of motion vector detecting regions set in a video area of each frame of a moving image by a typical point matching method; means which specifies a region in which the detected motion vector has high reliability of the motion vector detecting regions on the basis of the average value of the correlative accumulated values detected for each of the motion vector detecting regions and which calculates the number of detection regions in which the detected motion vectors have high reliability; means which determines whether the number of detection regions in which the detected motion vectors have high reliability is not less than a first threshold value; means which, when the number of detection regions in which the detected moving vectors have high reliability is less than the first threshold value, determines that the frame is not panned/tilted; means which, when the number of detection regions in which the detected motion vectors have high reliability is not less than the first threshold value, specifies a detection region in which motions of a plurality of types are present and a detection region in which motions of a plurality of types are not present in the detection regions in which the motion vectors have high reliability on the basis of an average value of correlative accumulated values detected for the detection regions in which the motion vectors have high reliability and a minimum value of the correlative accumulated values, and which calculates the number of detection regions in which the motions of the plurality of types are present; means which determines whether the number of detection regions in which the motions of the plurality of types are present is less than a second threshold value; means which, when the number of detection regions in which the motions of the plurality of types are present is not less than the second threshold value, determines that the frame is not panned/tilted; means which, when the motions of the plurality of types are present is less than the second threshold value, specifies detection regions in which motion vectors have similarity in the detection regions in which the motion vectors have high reliability and the motions of the plurality of types are not present on the basis of a motion vector detected for the detection region in which the motion vector has high reliability and the motions of the plurality of types are not present, and which calculates the number of detection regions in which motion vectors have similarity; means which determines whether the number of detection regions in which motion vectors have similarity is not less than a third threshold value; means which, when the number of detection regions which are determined as detection regions in which the motion vectors have similarity is less than the third threshold value, determines that the frame is not panned/tilted; and means which, when the number of detection regions which are determined as detection regions in which the motion vectors have similarity is not less than the third threshold value, determines that the frame is panned/tilted.

According to the present invention, there is provided a third video apparatus having a pan/tilt determining apparatus which determines whether an image is in a pan/tilt state for each frame of a moving image, wherein the pan/tilt determining apparatus includes: means which calculates a motion vector, a minimum value of correlative accumulated values, and an average value of the correlative accumulated values for each of a plurality of motion vector detecting regions set in a video area of each frame of a moving image by a typical point matching method; means which specifies a region in which the detected motion vector has high reliability of the motion vector detecting regions on the basis of the average value of the correlative accumulated values detected for each of the motion vector detecting regions and which calculates the number of detection regions in which the detected motion vectors have high reliability; means which determines whether the number of detection regions in which the detected motion vectors have high reliability is not less than a first threshold value; means which, when the number of detection regions in which the detected moving vectors have high reliability is less than the first threshold value, determines that the frame is not panned/tilted; means which, when the number of detection regions in which the detected motion vectors have high reliability is not less than the first threshold value, specifies a detection region in which motions of a plurality of types are present and a detection region in which motions of a plurality of types are not present in the detection regions in which the motion vectors have high reliability on the basis of an average value of correlative accumulated values detected for the detection regions in which the motion vectors have high reliability and a minimum value of the correlative accumulated values, and which calculates the number of detection regions in which the motions of the plurality of types are present; means which determines whether the number of detection regions in which the motions of the plurality of types are present is less than a second threshold value; means which, when the number of detection regions in which the motions of the plurality of types are present is not less than the second threshold value, determines that the frame is not panned/tilted; and means which, when the number of detection regions in which the motions of the plurality of types are present is less than the second threshold value, determines that the frame is panned/tilted.

According to the present invention, there is provided a fourth video apparatus having a pan/tilt determining apparatus which determines whether an image is in a pan/tilt state for each frame of a moving image, wherein the pan/tilt determining apparatus includes: means which calculates a motion vector, a minimum value of correlative accumulated values, and an average value of the correlative accumulated values for each of a plurality of motion vector detecting regions set in a video area of each frame of a moving image by a typical point matching method; means which specifies a region in which the detected motion vector has high reliability of the motion vector detecting regions on the basis of the average value of the correlative accumulated values detected for each of the motion vector detecting regions and which calculates the number of detection regions in which the detected motion vectors have high reliability; means which determines whether the number of detection regions in which the detected motion vectors have high reliability is not less than a first threshold value; means which, when the number of detection regions in which the detected moving vectors have high reliability is less than the first threshold value, determines that the frame is not panned/tilted; means which, when the number of detection regions in which the detected motion vectors have high reliability is not less than the first threshold value, specifies a detection region in which motions of a plurality of types are present and a detection region in which motions of a plurality of types are not present in the detection regions in which the motion vectors have high reliability on the basis of an average value of correlative accumulated values detected for the detection regions in which the motion vectors have high reliability and a minimum value of the correlative accumulated values, and which calculates the number of detection regions in which the motions of the plurality of types are present; means which determines whether the number of detection regions in which the motions of the plurality of types are present is less than a second threshold value; means which, when the number of detection regions in which the motions of the plurality of types are present is not less than the second threshold value, determines that the frame is not panned/tilted; means which, when the number of detection regions in which the motions of the plurality of types are present is less than the second threshold value, specifies detection regions in which motion vectors have similarity in the detection regions in which the motion vectors have high reliability and the motions of the plurality of types are not present on the basis of a motion vector detected for the detection region in which the motion vector has high reliability and the motions of the plurality of types are not present, and which calculates the number of detection regions in which motion vectors have similarity; means which determines whether the number of detection regions in which motion vectors have similarity is not less than a third threshold value; means which, when the number of detection regions which are determined as detection regions in which the motion vectors have similarity is less than the third threshold value, determines that the frame is not panned/tilted; and means which, when the number of detection regions which are determined as detection regions in which the motion vectors have similarity is not less than the third threshold value, determines that the frame is panned/tilted.

According to the present invention, there is provided a third frame rate converting apparatus which converts a frame rate of a moving image, including: means which defines one of two continuous frames in a moving image as a current frame, defines the other as a previous frame, and defines a frame generated between the current frame and the previous frame as a prediction frame, which calculates a shift distance of the prediction image with respect to a previous frame image and a shift distance of the prediction image with respect to a current frame image, on the basis of a moving distance of an image between a previous frame image and a current frame image and a frame rate; means which shifts the previous frame image by using the shift distance of the prediction image with respect to the previous frame image to generate a first virtual prediction image constituted by a first blank portion in which the previous frame image is not present and a first original image portion in which the previous frame image is present; means which shifts the current frame image by using the shift distance of the prediction image with respect to the current frame image to generate a second virtual prediction image constituted by a second blank portion in which the current frame image is not present and a second original image portion in which the current frame image is present; and prediction image generating means which generates the prediction image on the basis of the previous frame image, the current frame image, the first virtual prediction image, and the second virtual prediction image, wherein the prediction image generating means, if the first virtual prediction image and the second virtual prediction image are overlapped, generates a prediction image from the second virtual prediction image in a portion where the first blank portion in the first virtual prediction image is overlapped on the second original image portion in the second virtual prediction image, generates a prediction image from the first virtual prediction image in a portion where the second blank portion in the second virtual prediction image is overlapped on the first original image portion in the first virtual prediction image, generates a prediction image by an image obtained by weighted-summing the current frame image and the previous frame image in a portion where the first blank portion and the second blank portion are overlapped, and generates a prediction image from one of the first virtual prediction image and the second virtual prediction image in a portion where the first original image portion in the first virtual prediction image is overlapped on the second original image portion in the second virtual prediction image.

According to the present invention, there is provided a fifth video apparatus having a frame rate converting apparatus which converts a frame rate of a moving image, wherein the frame rate converting apparatus includes: means which defines one of two continuous frames in a moving image as a current frame, defines the other as a previous frame, and defines a frame generated between the current frame and the previous frames as a prediction frame, which calculates a shift distance of the prediction image with respect to a previous frame image and a shift distance of the prediction image with respect to a current frame image, on the basis of a moving distance of an image between the previous frame image and a current frame image and a frame rate; means which shifts the previous frame image by using the shift distance of the prediction image with respect to the previous frame image to generate a first virtual prediction image constituted by a first blank portion in which the previous frame image is not present and a first original image portion in which the previous frame image is present; means which shifts the current frame image by using the shift distance of the prediction image with respect to the current frame image to generate a second virtual prediction image constituted by a second blank portion in which the current frame image is not present and a second original image portion in which the current frame image is present; and prediction image generating means which generates the prediction image on the basis of the previous frame image, the current frame image, the first virtual prediction image, and the second virtual prediction image, wherein the prediction image generating means, if the first virtual prediction image and the second virtual prediction image are overlapped, generates a prediction image from the second virtual prediction image in a portion where the first blank portion in the first virtual prediction image is overlapped on the second original image portion in the second virtual prediction image, generates a prediction image from the first virtual prediction image in a portion where the second blank portion in the second virtual prediction image is overlapped on the first original image portion in the first virtual prediction image, generates a prediction image by an image obtained by weighted-summing the current frame image and the previous frame image in a portion where the first blank portion and the second blank portion are overlapped, and generates a prediction image from one of the first virtual prediction image and the second virtual prediction image in a portion where the first original image portion in the first virtual prediction image is overlapped on the second original image portion in the second virtual prediction image.

BRIEF DESCRIPTION OF THE DRAWINGS

FIG. 9 is a pattern diagram showing a previous frame image $F_1$, a current frame image $F_2$, and a prediction image $F_{12}$.

FIG. 15 is a pattern diagram for explaining an example of a conventional frame rate converting method.

DETAILED DESCRIPTION OF THE PREFERRED EMBODIMENT

An embodiment of the present invention will be described below with reference to the accompanying drawings.

[1] Explanation about Configuration of Digital Camera

Figure 1:
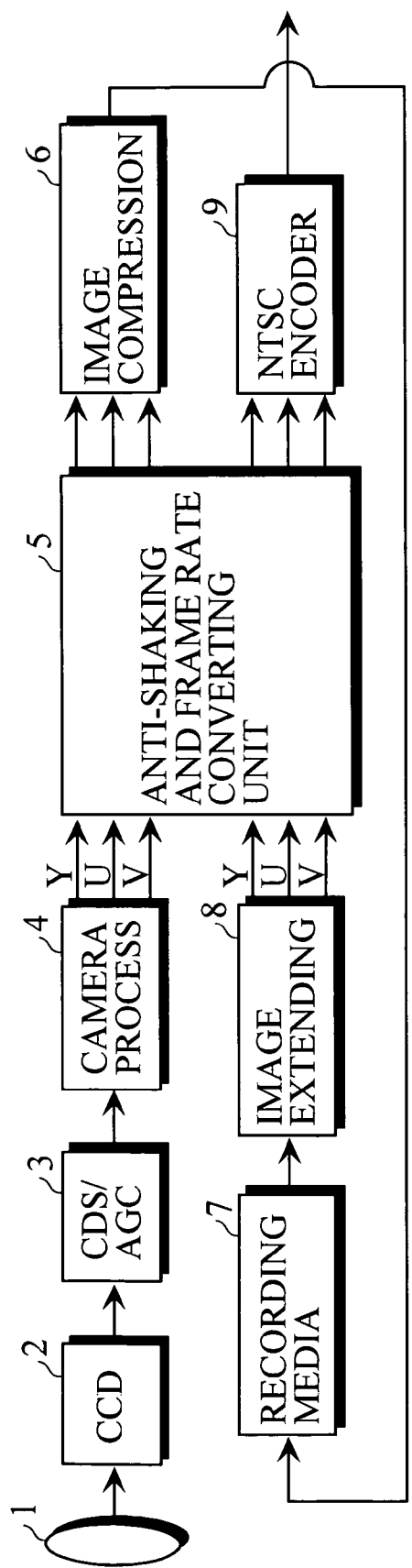
FIG. 1 is a block diagram showing a configuration of a digital camera.

FIG. 1 shows a configuration of a digital camera.

A CCD 2 performs photoelectric conversion of an optical image being incident through a lens 1 to output the optical image as an electric signal. An output signal (RGB signal) from the CCD 2 is transmitted to a CDS/AGC circuit 3 including a CDS circuit and an AGC circuit. An output signal input from the CCD 2 to the CDS/AGC circuit 3 is subjected to a correlative double sampling process by the CDS circuit and then adjusted in gain by the AGC circuit to have an optimum amplitude. An output from the CDS/AGC circuit 3 is converted into a YUV signal by a camera process circuit 4. Reference symbol Y denotes a luminance signal; U, a color difference signal representing (B−Y); V, a color difference signal representing (R−Y).

The output signal (YUV signal) from the camera process circuit 4 is subjected to an anti-shaking process by an anti-shaking and frame rate converting unit 5 and then transmitted to an image compressing circuit 6. In the image compressing circuit 6, a compressing process is performed to the signal (YUV signal) obtained after the anti-shaking process. An output signal from the image compressing circuit 6 is recorded on a recording media 7.

When a compressed image recorded on the recording media 7 is displayed on a television receiver or the like, the compressed image recorded on the recording media 7 is read and transmitted to an image extending circuit 8. In the image extending circuit 8, the compressed image is extended to obtain a YUV signal. The output signal (YUV signal) from the image extending circuit 8 is subjected to a frame rate converting process by the anti-shaking and frame rate converting unit 5 and then transmitted to an NTSC encoder 9. In the NTSC encoder 9, the signal (YUV signal) subjected to the frame rate converting process is NTSC-encoded and output as an external output.

[2] Explanation about Configuration of Anti-Shaking and Frame Rate Converting Unit 5

Figure 2:
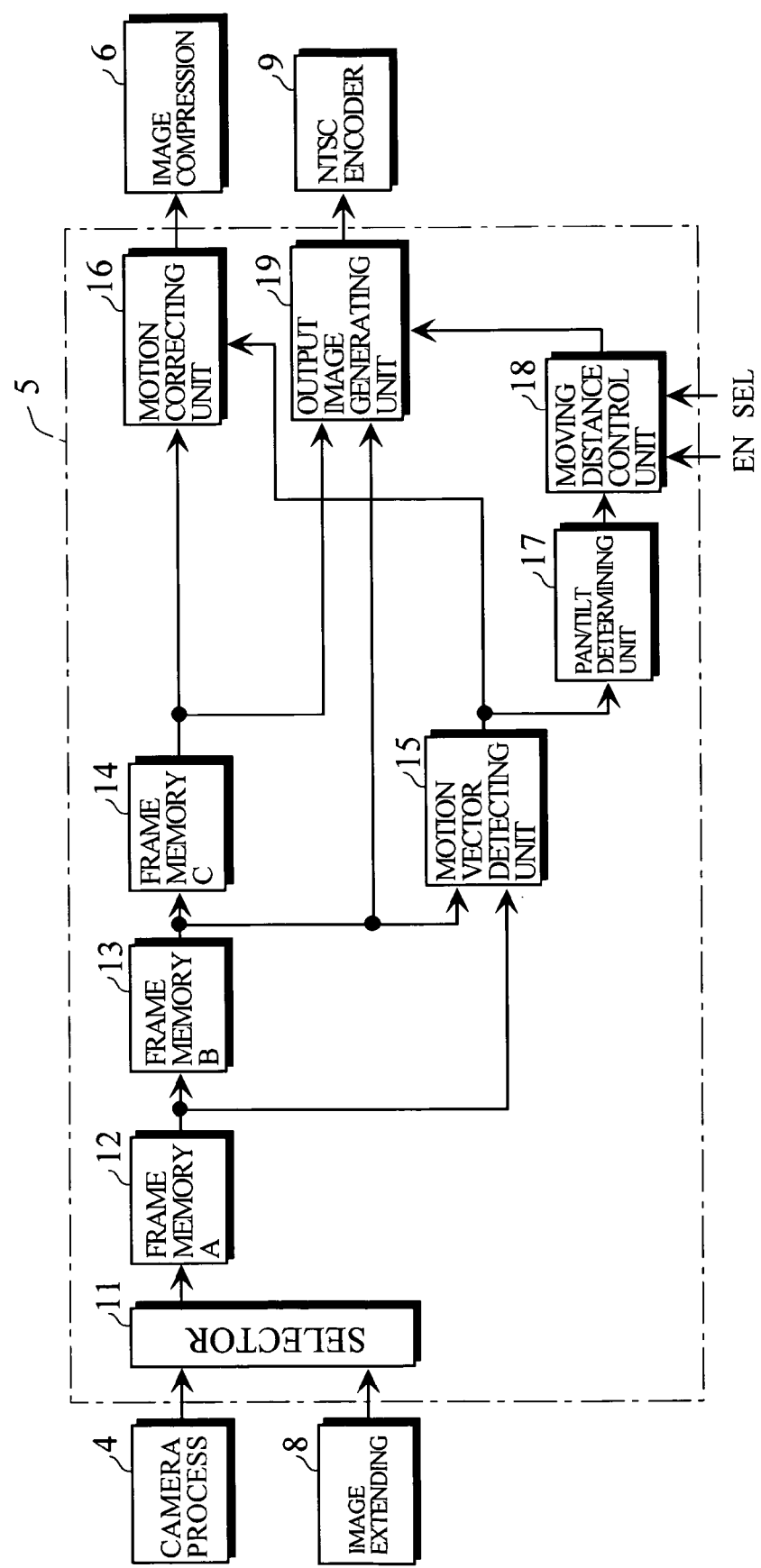
FIG. 2 is a block diagram showing a configuration of an anti-shaking and frame rate converting unit 5 for a luminance signal Y.

FIG. 2 shows a configuration of the anti-shaking and frame rate converting unit 5 for the luminance signal Y. Since the anti-shaking and frame rate converting units 5 for the luminance signal Y and the color difference signals U and V having the same configurations, the configuration for the luminance signal Y will be described below.

[2-1] Explanation about Operation in Image Recording

When a photographed image is recorded, the luminance signal Y obtained by the camera process circuit 4 is written in a first frame memory (frame memory A) 12 through a selector 11. The luminance signal Y written in the first frame memory 12 is read at a predetermined timing and written in a second frame memory (frame memory B) 13. The luminance signal Y written in the second frame memory 13 is read at a predetermined timing and written in a third frame memory (frame memory C) 14.

The luminance signal Y read from the first frame memory 12 and the luminance signal Y read from the second frame memory 13 are transmitted to a motion vector detecting unit 15 to detect a motion vector or the like. The motion vector or the like detected by the motion vector detecting unit 15 is transmitted to a motion correcting unit 16.

The luminance signal Y read from the third frame memory 14 is transmitted to the motion correcting unit 16. In the motion correcting unit 16, on the basis of the motion vector or the like detected by the motion vector detecting unit 15, motion correction is performed to the luminance signal Y read from the third frame memory 14. The luminance signal Y subjected to the motion correction by the motion correcting unit 16 is transmitted to the image compressing circuit 6.

[2-2] Explanation about Operation in Image Reproduction

An operation performed when a reproduction image is generated from a compressed image recorded on the recording media 7 will be described below.

The compressed luminance signal recorded on the recording media 7 is transmitted to the image extending circuit 8 and extended. The luminance signal Y obtained by the image extending circuit 8 is transmitted to the anti-shaking and frame rate converting unit 5. A frame rate of the luminance signal Y read from the recording media 7 and obtained by the image extending circuit 8 is 30 frames/second. In the anti-shaking and frame rate converting unit 5, the luminance signal Y transmitted from the image extending circuit 8 at 30 frames/second is converted into a luminance signal Y at 60 frames/second. That is, the frame rate is made double.

The luminance signal Y transmitted from the image extending circuit 8 to the anti-shaking and frame rate converting unit 5 is written in the first frame memory (frame memory A) 12 through the selector 11. The luminance signal Y written in the first frame memory 12 is read at a predetermined timing and written in the second frame memory (frame memory B) 13. The luminance signal Y written in the second frame memory 13 is read at a predetermined timing and written in the third frame memory (frame memory C) 14.

The luminance signal Y read from the first frame memory (frame memory A) 12 and the luminance signal Y read from the second frame memory 13 are transmitted to the motion vector detecting unit 15 to detect a motion vector or the like. The motion vector or the like detected by the motion vector detecting unit 15 is transmitted to a pan/tilt determining unit 17. The pan/tilt determining unit 17 determines whether the frame is a frame photographed in a pan or tilt state on the basis of the motion vector or the like detected by the motion vector detecting unit 15. Depending on the determination result, a temporary moving distance MA of the frame is calculated.

The temporary moving distance MA calculated by the pan/tilt determining unit 17 is transmitted to the moving distance control unit 18. The moving distance control unit 18 calculates a moving distance M used in generation of a prediction image on the basis of the temporary moving distance MA calculated by the pan/tilt determining unit 17 and the determination result of the pan/tilt determining unit 17. The moving distance M calculated by the moving distance control unit 18 is transmitted to an output image generating unit 19.

The luminance signal Y read from the second frame memory 13 and the luminance signal Y read from the third frame memory 14 are transmitted to the output image generating unit 19. The output image generating unit 19 generates an output image on the basis of the luminance signal Y read from the second frame memory 13, the luminance signal Y read from the third frame memory 14, and the moving distance M calculated by the moving distance control unit 18. The output image generated by the output image generating unit 19 is transmitted to the NTSC encoder 9.

Of the circuits used in frame rate conversion, as the frame memories 12, 13, and 14 and the motion vector detecting unit 15, the frame memories 12, 13, and 14 and the motion vector detecting unit 15 in the circuit used in an anti-shaking operation can be used. For this reason, a simple configuration can be achieved.

[3] Detailed Explanation about Operation in Image Reproduction

An operation in image reproduction will be described below.

Figure 3:
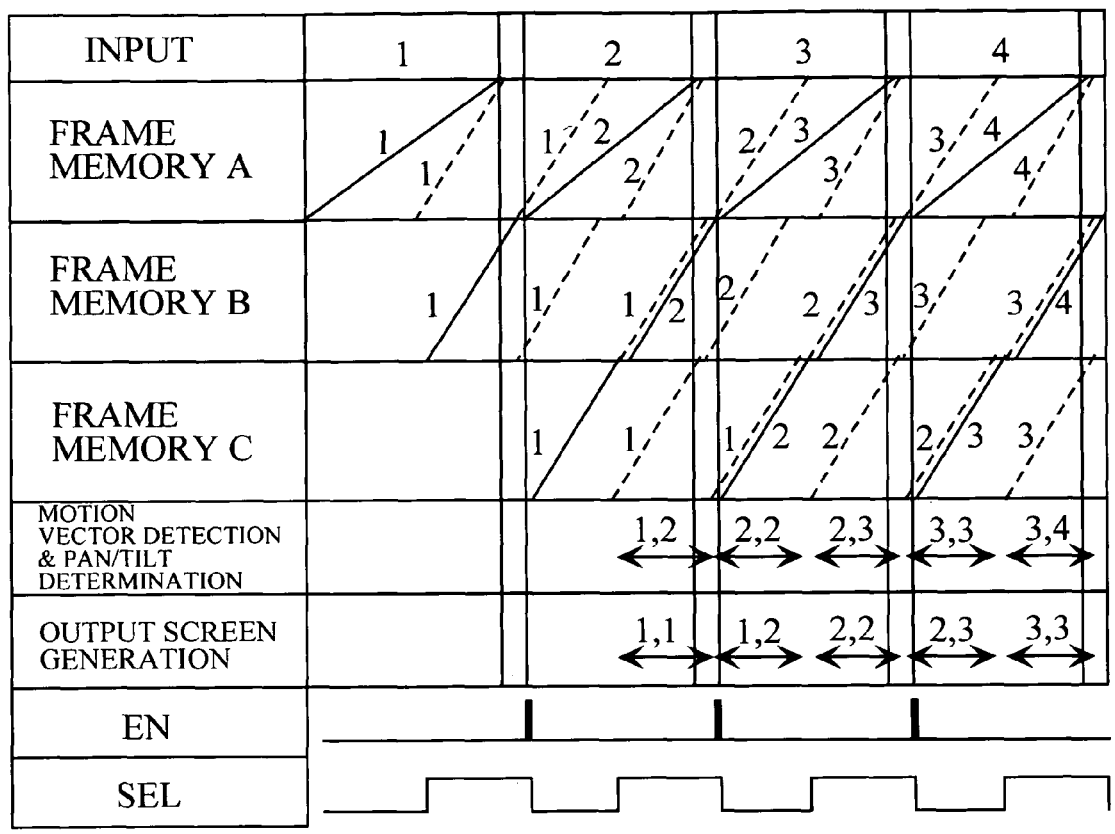
FIG. 3 is a timing chart showing timings of writing in and reading from frame memories A, B, and C.

[3-1] Explanation about Timings of Writing in and Reading from Frame Memories A, B, and C FIG. 3 shows timings of writing in and reading from the frame memories A, B, and C. In FIG. 3, a signal EN is an enable signal generated for each frame of an original video signal, and a signal SEL is a selection signal to control a moving distance of the moving distance control unit 18. The enable signal EN and the selection signal SEL are given to the moving distance control unit 18.

[3-2] Explanation about Motion Vector Detecting Unit 15

Figure 4:
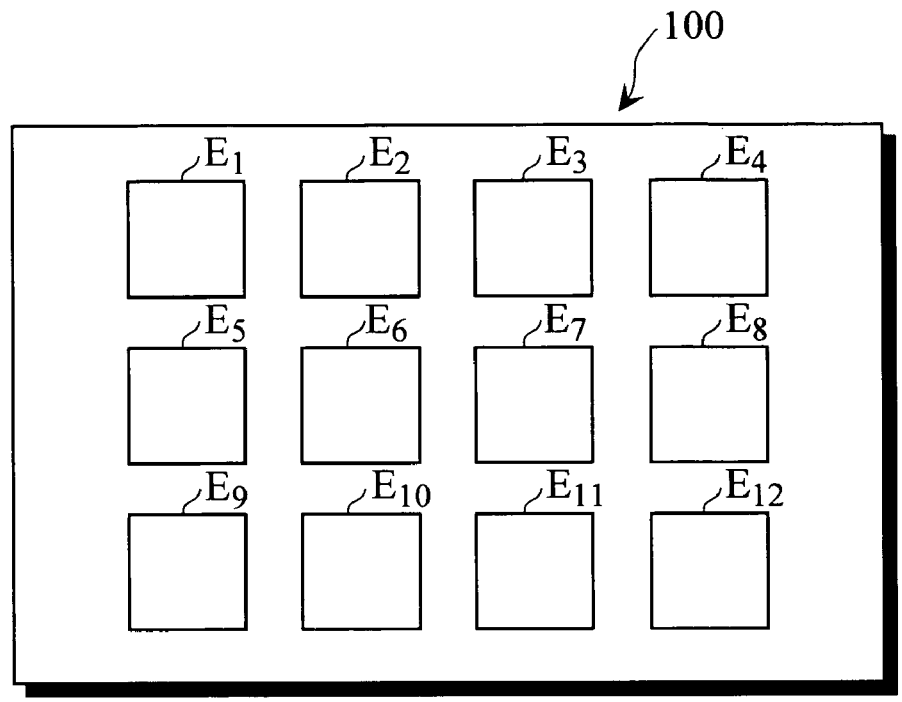
FIG. 4 is a pattern diagram showing a plurality of motion vector detecting regions $E_1$ to $E_{12}$ set in a video area 100 of each frame.
Figure 5:
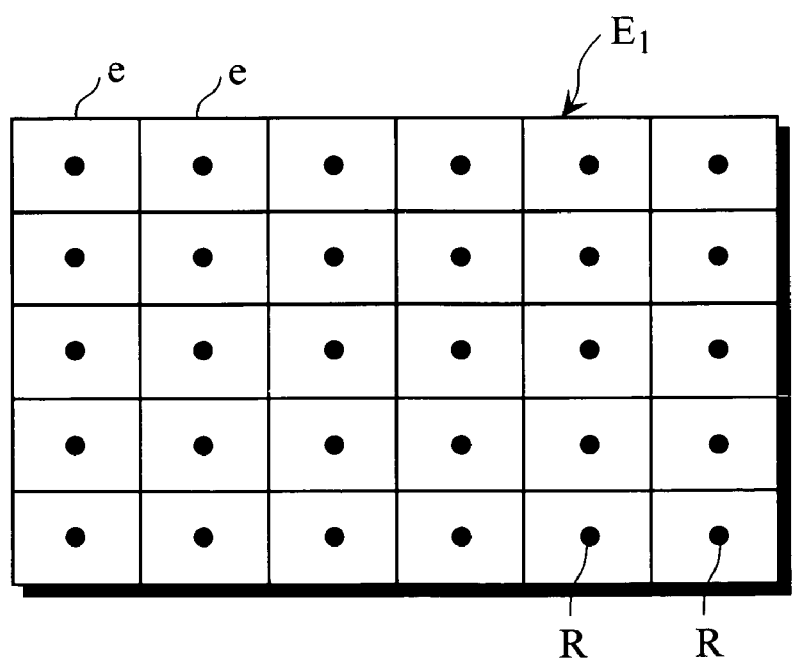
FIG. 5 is a pattern diagram showing small regions e in the motion vector detecting regions $E_1$ to $E_{12}$ in FIG. 4.
Figure 6:
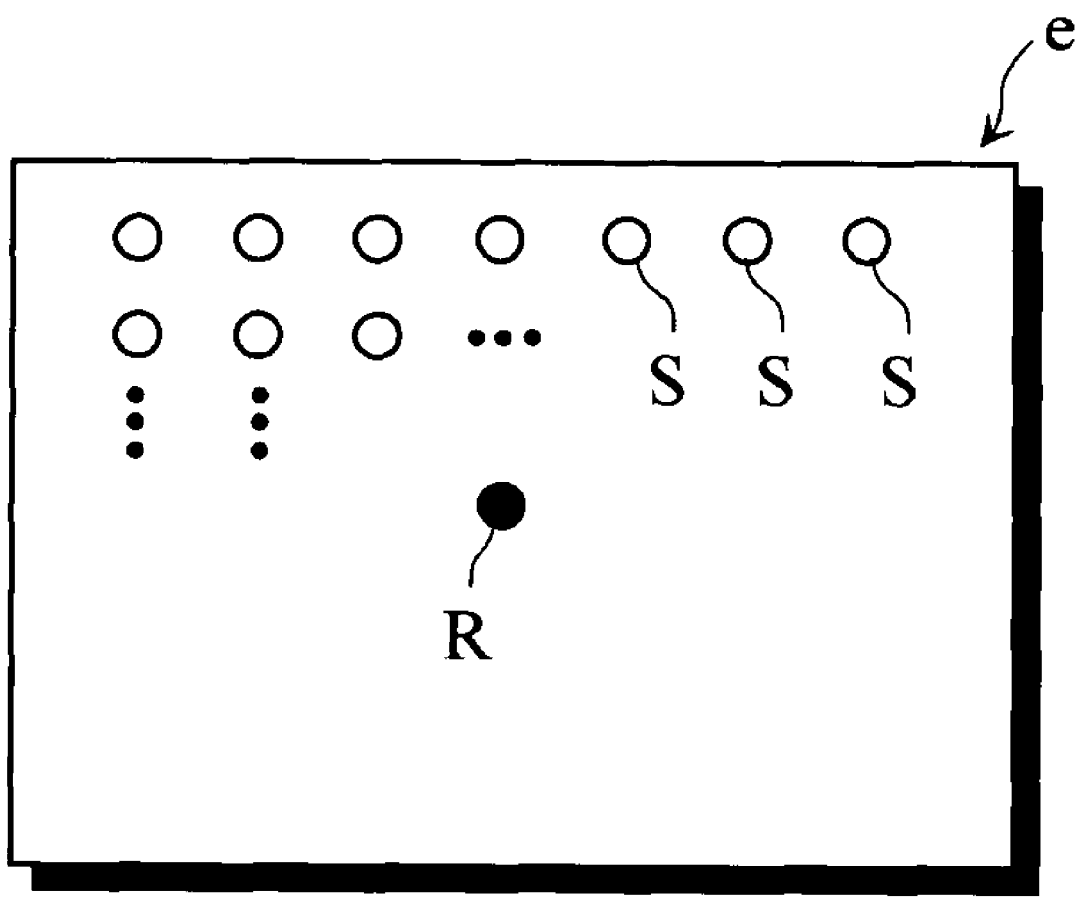
FIG. 6 is a pattern diagram showing a plurality of sampling points S and one typical point R set in the small region e in FIG. 5.

The motion vector detecting unit 15 calculates a motion vector or the like on the basis of a typical matching method. As shown in FIG. 4, a plurality of motion vector detecting regions $E_1$ to $E_{12}$ are set in a video area 100 of each frame. The motion vector detecting regions $E_1$ to $E_{12}$ have equal sizes. Each of the motion vector detecting regions $E_1$ to $E_{12}$ is divided into small regions e as shown in FIG. 5. As shown in FIG. 6, a plurality of sampling points S and one typical point R are set in each small region e.

A difference (correlative value at each sampling point S) between a video signal level (luminance level) of each sampling point S in the small region e in a current frame and a video signal level (luminance level) of the typical point R in a corresponding small region e in a previous frame is calculated for each of the motion vector detecting regions $E_1$ to $E_{12}$.

Correlative values of sampling points having equal deflections with respect to the typical point R are accumulatively added between all the small regions e in each of the motion vector detecting regions $E_1$ to $E_{12}$. Therefore, correlative accumulated values, the number of which depends on the number of sampling points S in one small region e are calculated for each of the motion vector detecting regions $E_1$ to $E_{12}$.

In each of the motion vector detecting regions $E_1$ to $E_{12}$, a deflection of a point at which the correlative accumulated value is minimum, i.e., a deflection having maximum correlativity is extracted as a motion vector V of a corresponding one of the motion vector detecting regions $E_1$ to $E_{12}$.

Furthermore, in the embodiment, a minimum value MIN of the correlative accumulated values is calculated for each of the motion vector detecting regions $E_1$ to $E_{12}$, and an average value AVE of the correlative accumulated values is calculated for each of the motion vector detecting regions $E_1$ to $E_{12}$.

[3-3] Explanation about Pan/Tilt Determining Unit 17

Figure 7:
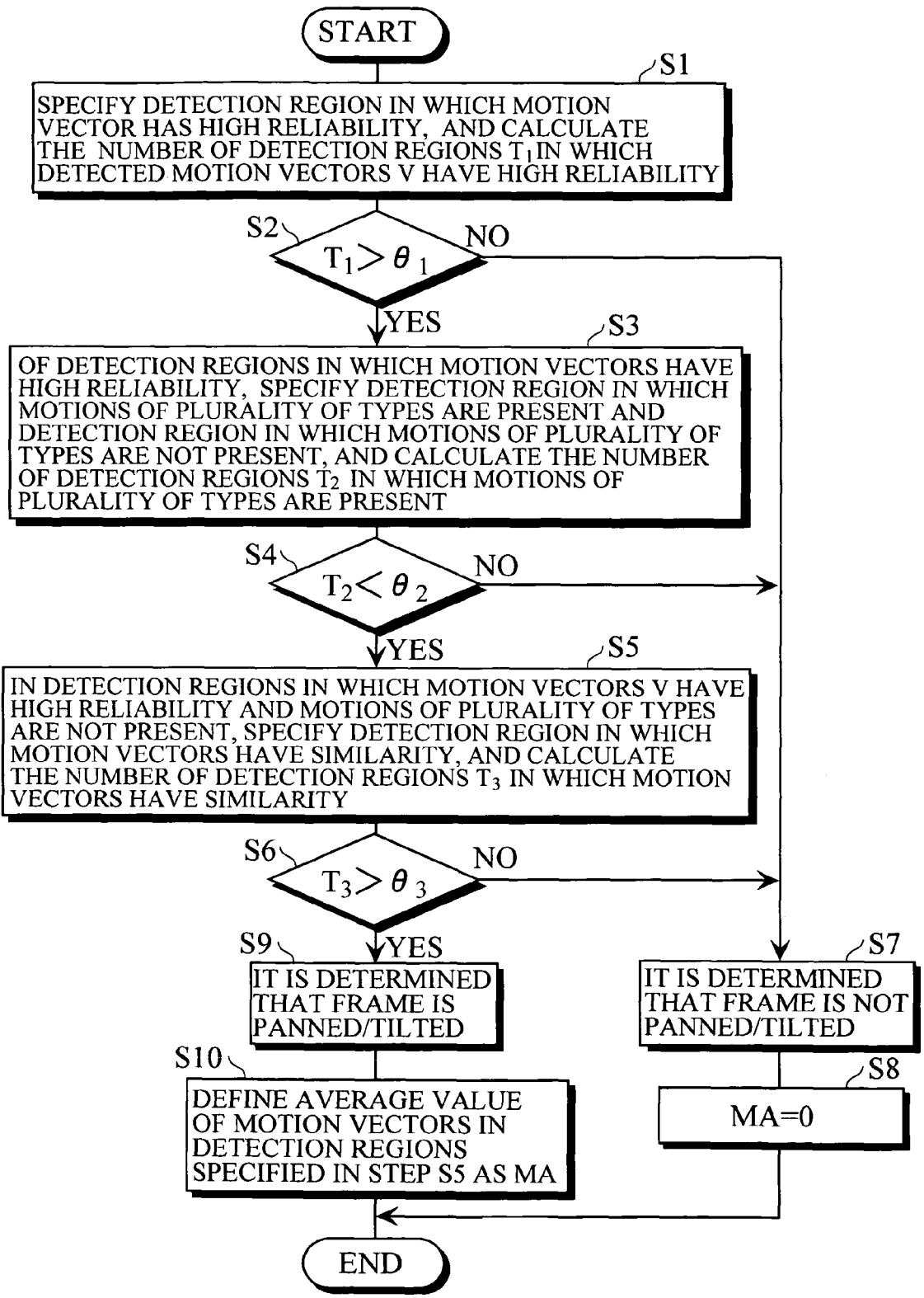
FIG. 7 is a flow chart showing a pan/tilt determining procedure performed by the pan/tilt determining unit 17.

FIG. 7 shows a pan/tilt determining procedure performed by the pan/tilt determining unit 17 will be described below.

Of the motion vector detection regions, a detection region in which a detected motion vector V has high reliability is specified, and the number of detection regions $T_1$ in which the detected motion vectors V have high reliability is calculated (step S1).

In a region having a small change in luminance, a motion vector cannot be correctly detected. In the region having a small change in luminance, an average value AVE of correlative accumulated values becomes small. Therefore, when the average value AVE of the correlative accumulated values is larger than a predetermined threshold value α, it is determined that the motion vector V detected in the motion vector detection region has high reliability.

It is determined whether the number of detection regions $T_1$ in which the detected motion vectors V have high reliability is threshold value $\theta_1$ or more (step S2). When the number of detection regions $T_1$ in which the detected motion vectors V have high reliability is less than $\theta_1$, it is determined that the frame is not panned/tilted (step S7), and the temporary moving distance MA of the frame is set at 0 (step S8).

When the number of detection regions $T_1$ in which the detected motion vectors V have high reliability is $\theta_1$ or more, of the detection regions in which the detected motion vectors V have high reliability, a detection region in which motions of a plurality of types are present and a detection region in which motions of a plurality of types are not present are specified, and the number of detection regions $T_2$ in which motions of a plurality of types are present is calculated (step S3).

When the frame is panned or tilted, a motion of one type is present in the detection region. For this reason, of the detection regions in which the detected motion vectors V have high reliability, the number of detection regions $T_2$ in which motions of a plurality of types are present is calculated. When a value (AVE/MIN) obtained by dividing the average value AVE of the correlative accumulated values by the minimum value MIN of the correlative accumulated values is larger than a predetermined threshold value β, it is determined that the motion vector detection region has motions of a plurality of types.

It is determined whether the number of detection regions $T_2$ in which the motions of the plurality of types are present is less than a threshold value $\theta_2$ (step S4). When the number of detection regions $T_2$ in which the motions of the plurality of types are present is the threshold value $\theta_2$ or more, it is determined that the frame is not panned/tilted (step S7), and the temporary moving distance MA is set at 0 (step S8).

When the number of detection regions $T_2$ in which the motions of the plurality of types are present is less than the threshold value $\theta_2$, in detection regions in which detected motion vectors V have high reliability and motions of a plurality of types are not present, a detection region in which motion vectors have similarity is specified, and the number of detection regions $T_2$ in which motion vectors have similarity is calculated (step S5).

It is determined by the following method whether motion vectors have similarity. An average value *V of motion vectors in the detection regions in which the detected motion vector V has high reliability and the motions of a plurality of types are not present is calculated. An absolute value |V−*V| of a difference between the motion vector and the average value *V is smaller than a predetermined threshold value γ for each of the detection regions. When the absolute value is smaller than the predetermined threshold value γ, it is determined that the detected motion vector in the motion vector detection region has similarity to the motion vectors detected in these detection regions.

It is determined whether the number of detection regions $T_2$ in which the motion vectors have similarity is a threshold value $\theta_3$ or more (step S6). When the number of detection regions $T_2$ in which the motion vectors have similarity is less than the threshold value $\theta_3$, it is determined that the frame is not panned/tilted (step S7), and the temporary moving distance MA of the frame is set at 0 (step S8). When the number of detection regions $T_2$ in which the motion vectors have high similarity is the threshold value $\theta_3$, it is determined that the frame is panned/tilted (step S9), and the temporary moving distance MA of the frame is set at an average value of the motion vectors V in the detection regions (the number $T_3$) in which the motion vectors have similarity and which are specified in step S5 (step S10).

The processes in steps S5 and S6 may be omitted. More specifically, it is determined in step S4 that the number of detection regions $T_2$ in which the motions of the plurality of types are present is less than the threshold value $\theta_2$, it may be determined that the frame is panned/tilted. In this case, the temporary moving distance MA of the frame is set at the average value of the motion vectors in the detection regions in which the motions of the plurality of types and which are specified in step S3.

[3-4] Explanation about Moving Distance Control Unit 18

Figure 8:
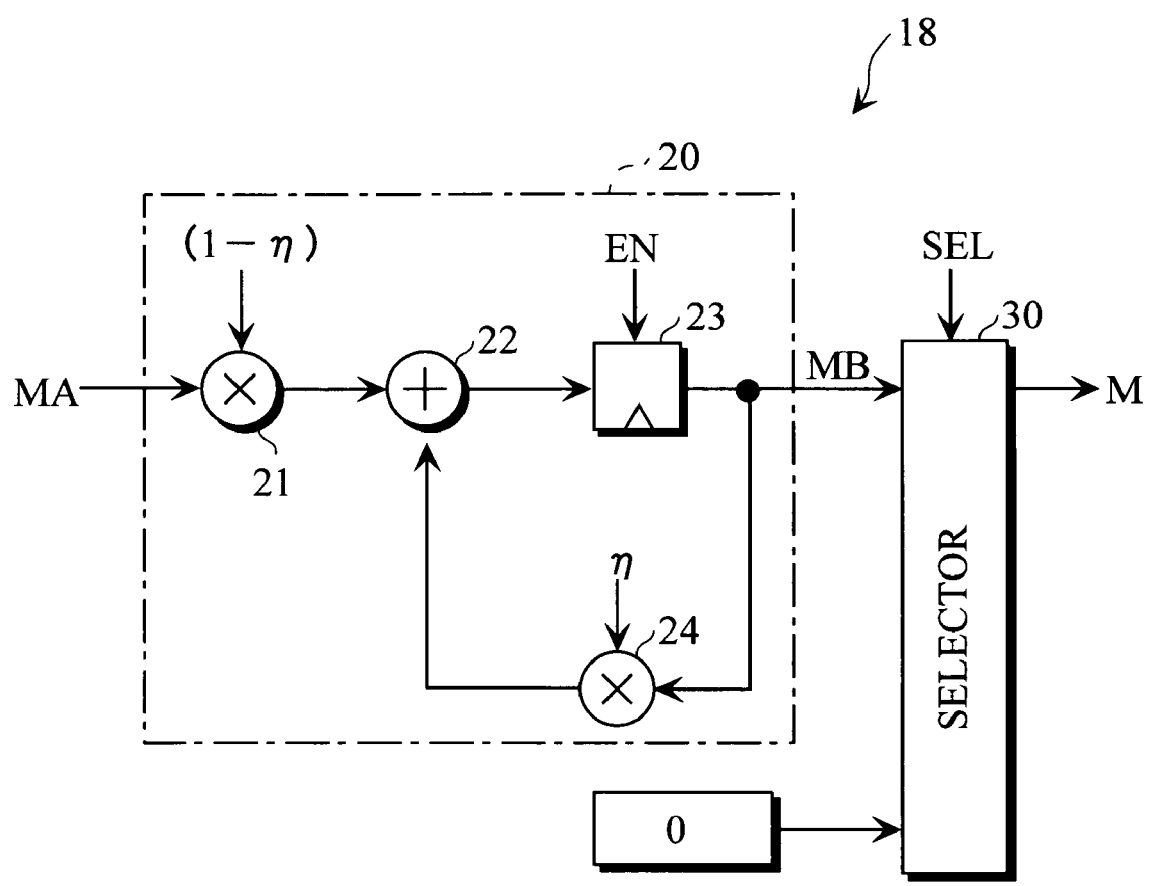
FIG. 8 is a circuit diagram showing a configuration of a moving distance control unit 18.

FIG. 8 shows a configuration of the moving distance control unit 18.

The moving distance control unit 18 includes a smoothing circuit 20 which smooths the temporary moving distance MA in a direction of time and a selector 30 in which an output MB from the smoothing circuit 20 and "0" are input. A selection signal SEL serving as a control signal is input to the selector 30.

The selection signal SEL, as shown in FIG. 3, is "1" when different frames are input to the motion vector detecting unit 15 (the same frames are input to the output image generating unit 19). When the same frames are input to the motion vector detecting unit 15 (different frames are input to the output image generating unit 19), the selection signal SEL is "0". The selector 30 outputs an input signal "0" as an actual moving distance M when the selection signal SEL is 1. When the selection signal SEL is 0, the selector 30 outputs the output MB from the smoothing circuit 20 as the actual moving distance M.

The smoothing circuit 20 includes a multiplier 21, an adder 22, a memory 23, and a multiplier 24. An enable signal EN is given to the memory 23 as a write/read, control signal.

A moving distance calculated for a first previous frame by the smoothing circuit 20 is represented by $MB_{t-1}$. The moving distance $MB_{t-1}$ calculated for the first previous frame is stored in the memory 23.

When a moving distance $MA_t$ for the current frame is input to the smoothing circuit 20, the multiplier 21 multiplies the moving distance MA for the current frame by a coefficient (1−η). On the other hand, the moving distance $MB_{t-1}$ calculated for the first previous frame is read from the memory 23 and transmitted to the selector 30 and the multiplier 24. The multiplier 24 multiplies the moving distance $MB_{t-1}$ calculated for the first previous frame by the coefficient η.

The adder 22 adds a multiplication result η $MB_{t-1}$ of the multiplier 24 to a (1−η)·$MA_t$ of the multiplier 21. An addition result (η $MB_{t-1}$+(1−η)·$MA_t$) of the adder 22 is stored in the memory 23 as a moving distance $MB_t$ calculated for the current frame.

More specifically, it is assumed that a moving distance after smoothing between the previous frame and a second previous frame is represented by $MB_{t-1}$ and that the moving distance between the current frame and the previous frame is represented by $MA_t$. In this case, a moving distance $MB_t$ obtained after smoothing between the current frame rate and the previous frame rate is calculated by the following equation (1):

$$MB_t = \eta\, MB_{t-1} + (1-\eta)\cdot MA_t \qquad (1)$$

where is a coefficient which regulates the degree of smoothing and falls within the range of $0 \leq \eta \leq 1$. As the coefficient increases, the degree of smoothing increases. When a frame determined to be panned/tilted is switched to a frame determined not to be panned/tilted, a sharp difference appears on a video image, and an unnatural moving image is obtained. Therefore, as expressed in the following equation (2), the values η are switched between the frame determined to be panned/tilted and the frame determined not to be panned/tilted.

frame which is panned/tilted: $\eta = \eta_1$ frame which is not panned/tilted: $\eta = \eta_2 (\eta_1 < \eta_2)$ (2)

[3-5] Explanation about Output Image Generating Unit 19

The output image generating unit 19 generates an output image on the basis of two images input from the frame memories 13 and 14 and the moving distance M given by the moving distance control unit 18.

When the two images input from the frame memories 13 and 14 are equal to each other, the moving distance M is 0. For this reason, one of the two images is output as an output image.

When the two images input from the frame memories 13 and 14 are different from each other, on the basis of the images, the moving distance M given by the moving distance control unit 18, and a conversion magnification m of a preset frame rate, (m−1) prediction images are generated. The obtained prediction images are output as output images. In this case, since the conversion magnification of the frame rate is 2, one prediction image is generated.

Of the two images input from the frame memories 13 and 14, an image having early recording time is called a previous frame, and an image having late recording time is called a current frame.

On the basis of the following equation (3), a shift distance $C_{t-1}$ of a prediction image for an image of the previous frame is calculated. Note that m=2 is satisfied.

$$C_{t-1} = M/m \tag{3}$$

The image of the previous frame is shifted by the shift distance $C_{t-1}$ to generate a prediction image. For example, as shown in FIG. 9, it is assumed that the image of the previous frame is defined as $F_1$ and that the image of the current frame is defined as $F_2$. In this case, when the image $F_1$ of the previous frame is moved by the shift distance $C_{t-1}$ to generate a prediction image $F_{12}$.

On the basis of the following equation (4), a shift distance $C_t$ of the prediction image for an image of the current frame is calculated, and the image of the current frame is moved by the shift distance $C_t$, so that a prediction image may be generated.

$$C_t = -M/m \tag{4}$$

The image of the previous frame may be moved by the shift distance $C_{t-1}$ to generate a first prediction image, the image of the current frame may be moved by the shift distance $C_t$ to generate a second prediction image, and the first prediction image and the second prediction image may be weighted-summed to generate an output image.

Figure 10:
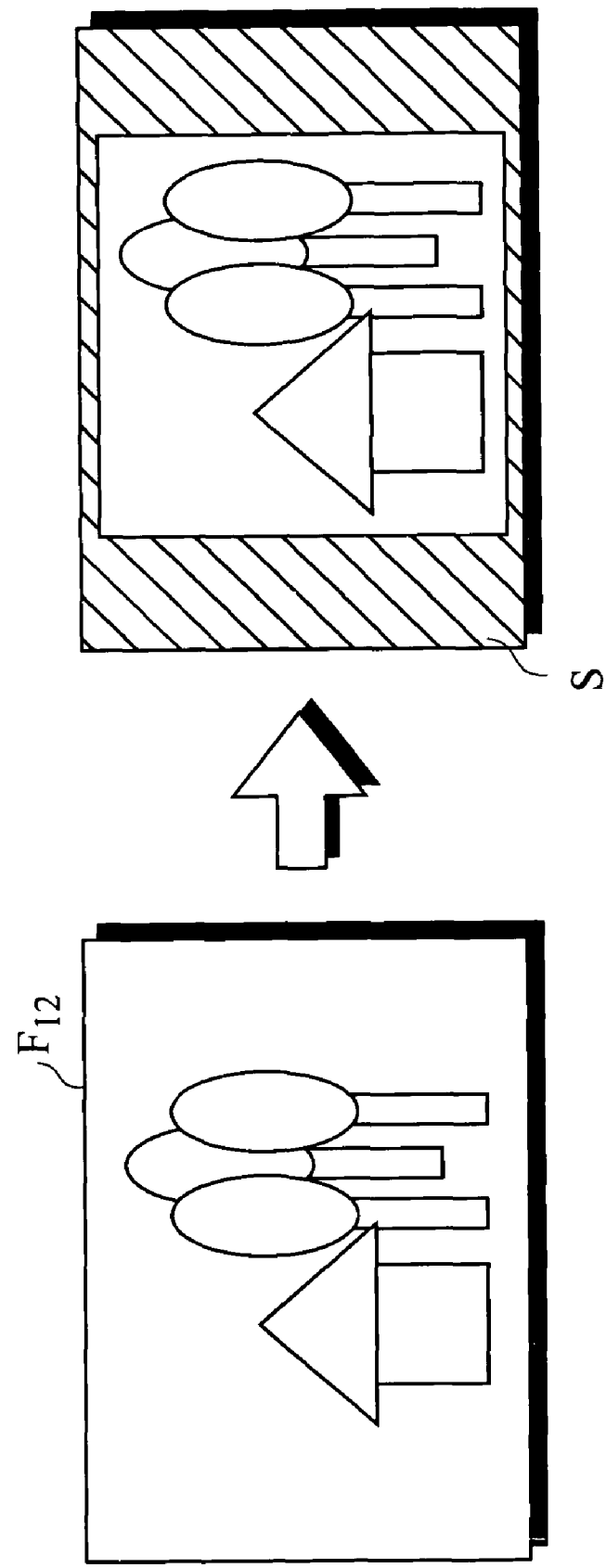
FIG. 10 is a pattern diagram showing an output obtained by masking a maximum blank range at a predetermined video level in the prediction image $F_{12}$.

When a prediction image is generated by moving an image of an original frame, a blank portion in which the image of the original frame is not present is formed in the prediction image. The maximum range of the portion where the blank is generated is calculated in advance. As shown in FIG. 10, the maximum range S of the blank in the prediction image $F_{12}$ is preferably masked at a predetermined video level (for example, black level) to generate an output image.

When the conversion magnification m of the frame rate is, for example, 3, two prediction images are generated. In this case, the shift distance $C_{t-1}$ of the first prediction image for the image of the previous frame is given by (1/3)×M, and the shift distance $C_{t-1}$ of the second prediction image for the image of the previous frame is given by (2/3)×M.

As described above, when the prediction image is generated by moving the image of the original frame, a blank portion where the image of the original frame is not present is formed in the prediction image. A method of generating a prediction image which is free from such a blank portion will be described below.

Figure 11:
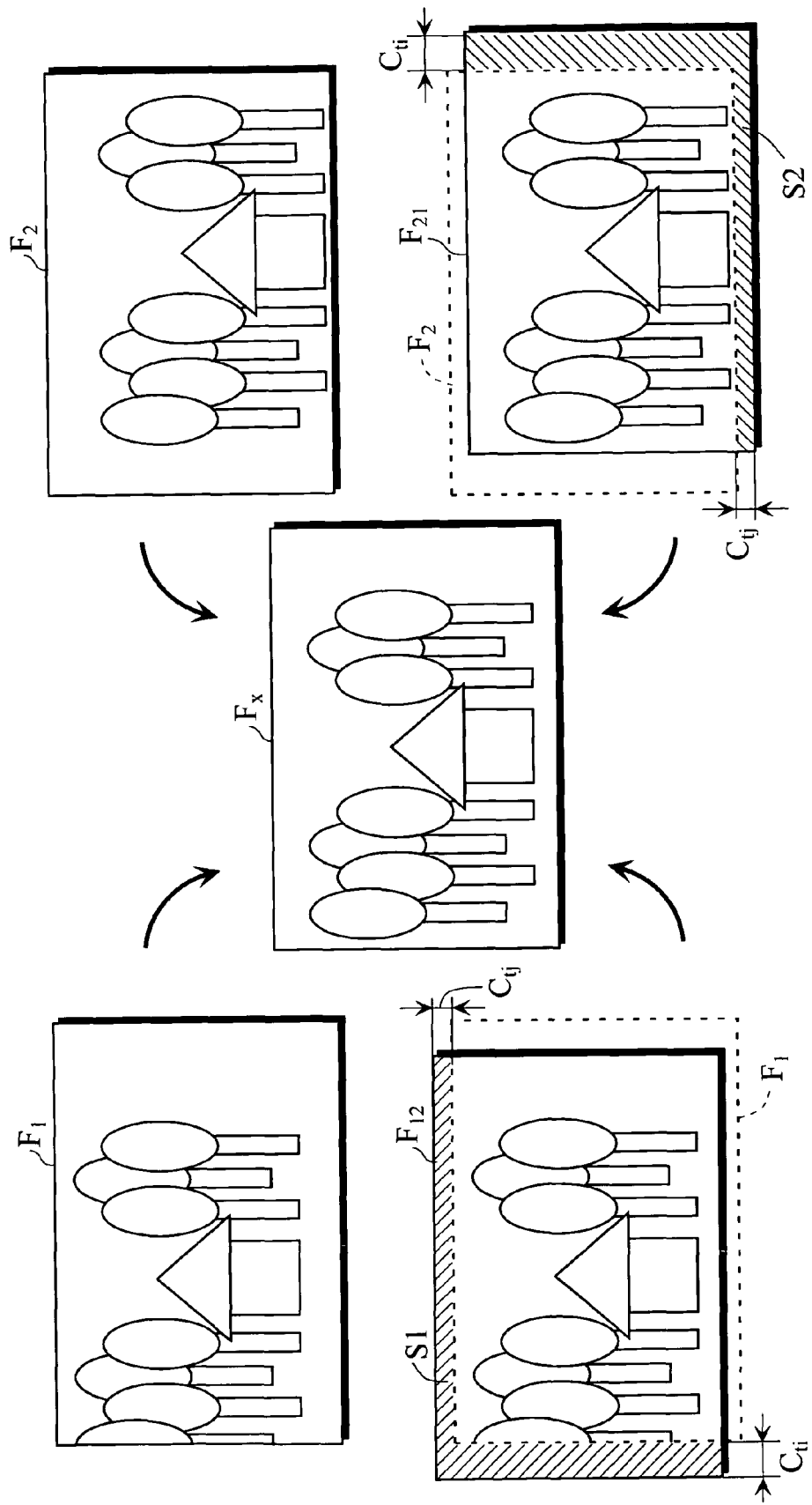
FIG. 11 shows a basic idea of a method of generating a blank-less prediction image.

FIG. 11 shows a basic idea of the method of generating a prediction image.

In FIG. 11, reference symbol $F_1$ denotes an image of the previous frame, and reference symbol $F_2$ denotes an image of the current frame.

In this case, it is assumed that a shift distance of a prediction image for the image $F_1$ of the previous frame is expressed by $C_t$ and that a shift distance of a prediction image for the image $F_2$ of the current frame is expressed by $C_{t+1}$. When the conversion magnification of the frame rate is represented by m, and a moving distance given by the moving distance control unit 18 is represented by M. In this case, the distances $C_t$ and $C_{t+1}$ are calculated by the following equation (5). In this example, m=2 is satisfied.

$$C_t = M/m$$

$$C_{t+1} = -M/m \tag{5}$$

The shift distances $C_t$ and $C_{t+1}$ consist of horizontal shift distances $C_{ti}$, $C_{(t+1)i}$ and vertical shift distances $C_{tj}$, $C_{(t+1)j}$, respectively.

A sign of the horizontal shift distance $C_{ti}$ obtained when the image $F_1$ of the previous frame is shifted to right is set as a positive (plus) sign, and a sign of the vertical shift distance $C_{tj}$ obtained when the image $F_1$ of the previous frame is shift downward is set as a positive (plus) sign.

In the example in FIG. 11, a case in which both the signs of $C_{ti}$ and $C_{tj}$ are positive is explained. A prediction image $F_{12}$ obtained by shifting the image $F_1$ of the previous frame by the shift distance $C_t$ is generated. The first virtual prediction image $F_{12}$ is an image obtained by shifting the image $F_1$ of the previous frame to right by $C_{ti}$ and downward by $C_{tj}$. A hatched portion S1 in the first virtual prediction image $F_{12}$ indicates a blank portion where the image $F_1$ of the original frame is not present.

A second virtual prediction image $F_{21}$ obtained by shifting the image $F_2$ of the current frame by a shift distance $C_{t+1}$ is generated. The second virtual prediction image $F_{21}$ is an image obtained by shifting the image $F_2$ of the current frame to left by $C_{ti}$ and upward by $C_{tj}$. A hatched portion S2 in the second virtual prediction image $F_{21}$ indicates a blank portion where the image $F_2$ of the original frame is not present.

On the basis of the image $F_1$ of the previous frame, the image $F_2$ of the current frame, the first virtual prediction image $F_{12}$, and the second virtual prediction image $F_{21}$, a prediction image $F_x$ which is free from a blank portion is generated.

Figure 12:
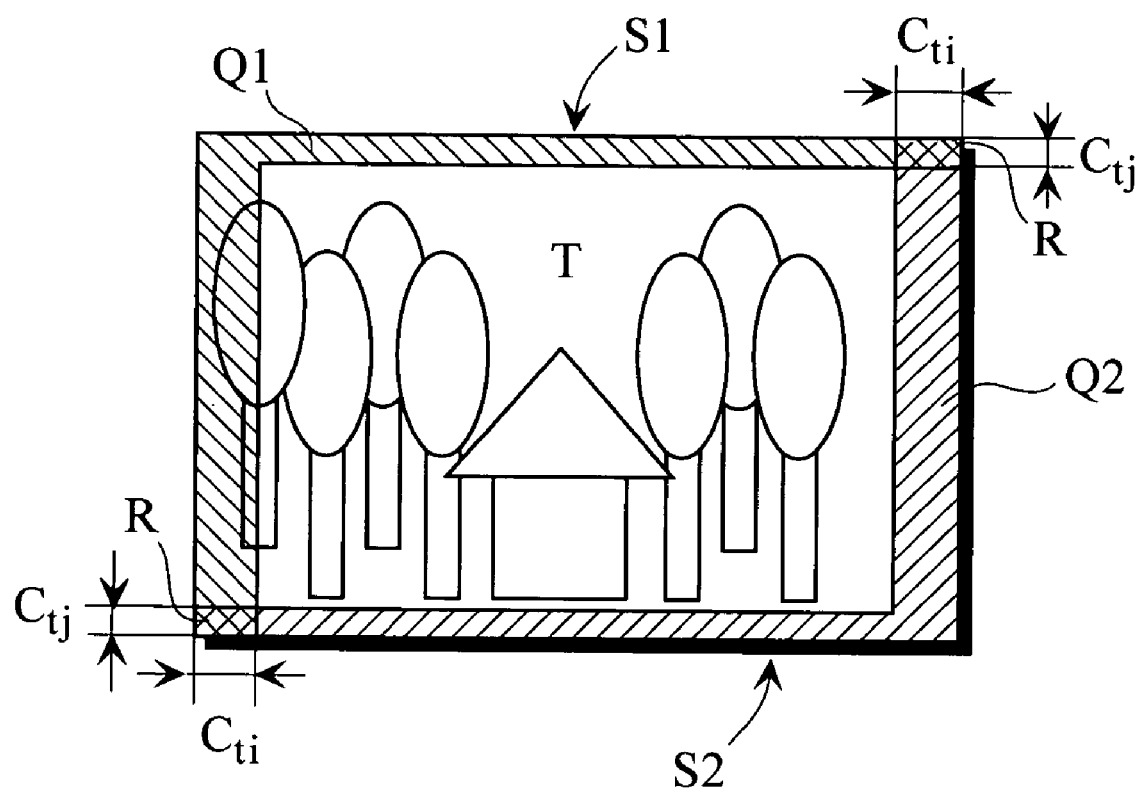
FIG. 12 is a pattern diagram showing a diagram obtained by overlapping a prediction image $F_x$, a first virtual prediction image $F_{12}$, and a second virtual prediction image $F_{21}$.

FIG. 12 is a diagram obtained by overlapping the prediction image $F_x$, the first virtual prediction image $F_{12}$, and the second virtual prediction image $F_{21}$.

In FIG. 12, a blank portion in the first virtual prediction image $F_{12}$ is defined as a region S1, and a blank portion in the second virtual prediction image $F_{21}$ is defined as a region S2. A portion of the region S1 which is not overlapped on the region S2 is represented by Q1, and a portion of the region S2 which is not overlapped on the region S1 is represented by Q2. Two corner portions where the region S1 and the region S2 are overlapped are represented by R, and other regions are represented by T.

With respect to the regions T in the prediction image $F_x$, a prediction image can be generated from any one of the first virtual prediction image $F_{12}$ and the second virtual prediction image $F_{21}$. However, in this example, the prediction image is generated from the first virtual prediction image $F_{12}$. With respect to the region Q1 in the prediction image $F_x$, an original image is present in the second virtual prediction image $F_{21}$. For this reason, the prediction image is generated from the second virtual prediction image $F_{21}$. With respect to the region Q2 in the prediction image $F_x$, the original image is present in the first virtual prediction image $F_{12}$. For this reason, the prediction image is generated from the first virtual prediction image $F_{12}$. With respect to the regions R in the prediction image $F_x$, an image obtained by weighted-summing the image $F_1$ of the previous frame and the image $F_2$ of the current frame. In this manner, the prediction image $F_x$ which is free from a blank portion can be generated.

Figure 13:
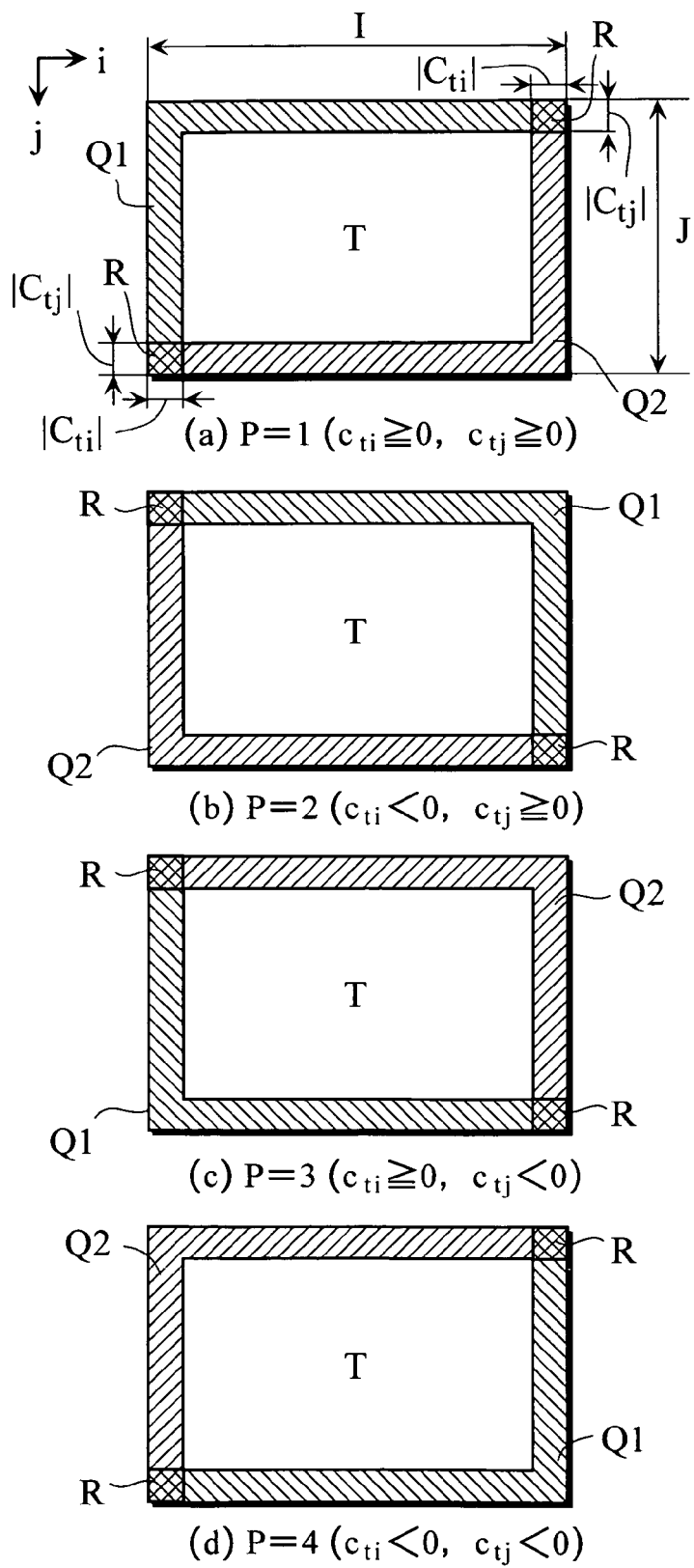
FIG. 13 is a pattern diagram showing types of arrangement patterns of regions Q1, Q2, R, and T in the prediction image $F_x$.

The case in which both the signs of the shift distances $C_{ti}$ and $C_{tj}$ are positive is described above. However, depending on a combination of the signs of the shift distances $C_{ti}$ and $C_{tj}$, as arrangement patterns of the regions Q1, Q2, R, and T in the prediction image $F_x$, patterns (P=1 to 4) of four types are present as shown in FIG. 13.

In the patterns P1 to P4, with respect to the region T in the prediction image $F_x$, the prediction image is generated from the first virtual prediction image $F_{12}$. With respect to the region Q1 in the prediction image $F_x$, the prediction image is generated from the second virtual prediction image $F_{21}$. With respect to the region Q2 in the prediction image $F_x$, the prediction image is generated from the first virtual prediction image $F_{12}$. With respect to the region R in the prediction image $F_x$, the prediction image is generated from the image obtained by weighted-summing the image $F_1$ of the previous frame and the image $F_2$ of the current frame. In this manner, the prediction image $F_x$ which is free from a blank portion can be generated.

Figure 14:
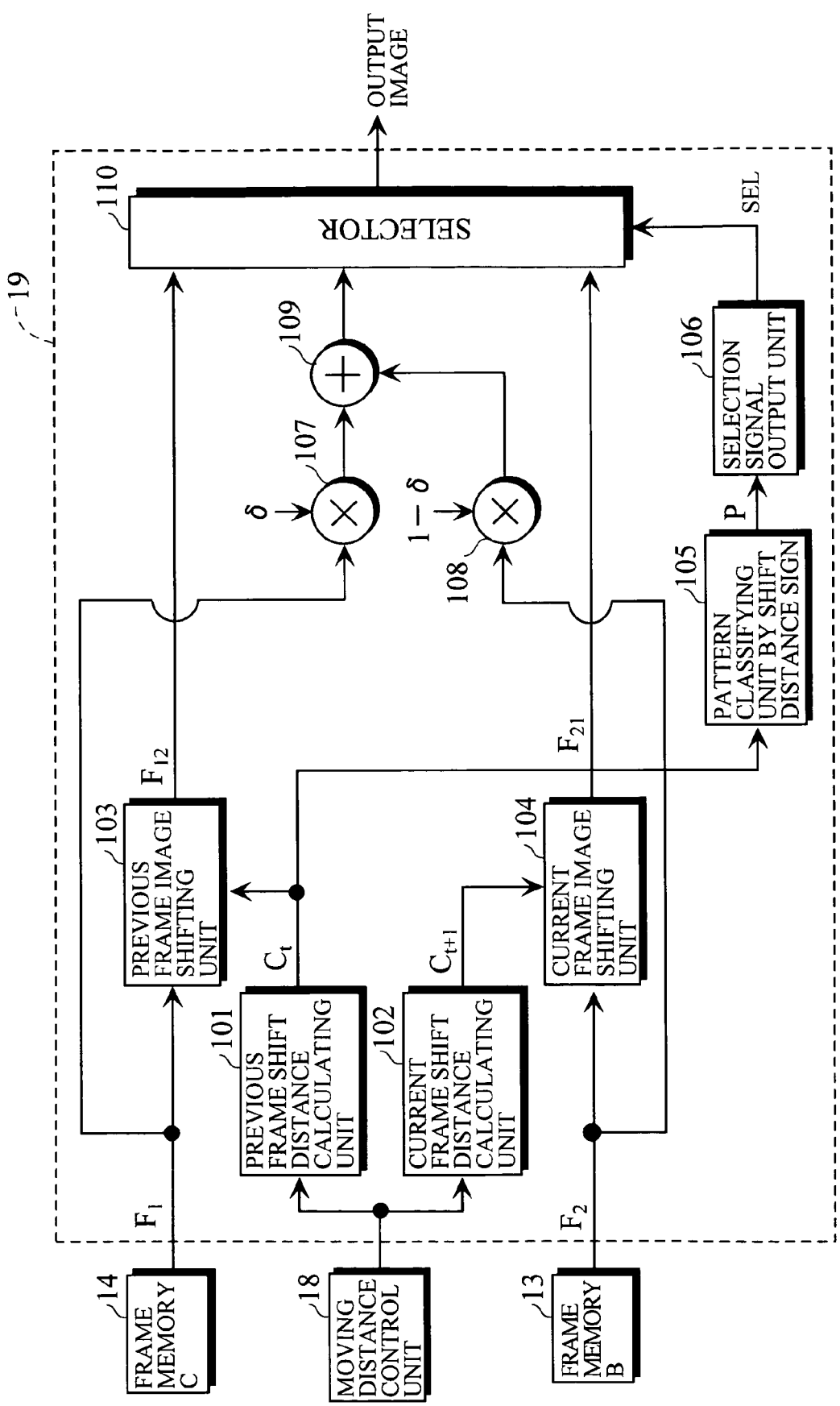
FIG. 14 is a block diagram showing a configuration of an output image generating unit 19.

FIG. 14 shows a configuration of the output image generating unit 19 to generate the prediction image $F_x$ described above.

Reference symbol 101 denotes a previous frame shift distance calculating unit which calculates a shift distance $C_t$ of the image $F_1$ of the previous frame on the basis of a moving distance M given by the moving distance control unit 18. Reference numeral 102 denotes a current frame shift distance calculating unit which calculates a shift distance $C_{t+1}$ of the image $F_2$ of the current frame on the basis of the moving distance M given by the moving distance control unit 18.

Reference numeral 103 denotes a previous frame image shifting unit which generates the first virtual prediction image $F_{12}$ obtained by shifting the image $F_1$ of the previous frame given by the frame memory C (14) by the shift distance $C_t$. Reference numeral 104 denotes a current frame image shifting unit which generates the second virtual prediction image $F_{21}$ obtained by shifting the image $F_2$ of the current frame given by the frame memory B (13) by the shift distance $C_{t+1}$.

Reference numeral 107 denotes a multiplier which multiplies the image $F_1$ of the previous frame given by the frame memory C (14) by a coefficient $\delta$ ($0 \leq \delta \leq 1$). Reference numeral 108 denotes a multiplier which multiplies the image $F_2$ of the current frame given by the frame memory B (13) by a coefficient $(1-\delta)$. Reference numeral 109 denotes an adder which adds a multiplication result of the multiplier 107 and a multiplication result of the multiplier 108. From the adder 109, an image obtained by weighted-summing the image $F_1$ of the previous frame and the image $F_2$ of the current frame is output.

The first virtual prediction image $F_{12}$ output from the previous frame image shifting unit 103, the second virtual prediction image $F_{21}$ output from the current frame image shifting unit 104, and the weighted-summed image output from the adder 109 are input to a selector 110.

Reference numeral 105 denotes a pattern classifying unit which classifies patterns into the arrangement patterns of the four types shown in FIG. 13 on the basis of the signs of the horizontal shift distance $C_{ti}$ and the vertical shift distance $C_{tj}$ of the image F1 of the previous frame. Reference numeral 106 denotes a selection signal output unit which outputs a selection signal SEL to the selector 110 on the basis of a pattern P classified by the pattern classifying unit 105.

The pattern classifying unit 105 outputs a pattern signal P on the basis of the following conditional equations (6).

If $C_{ti} \leq 0$ and $C_{tj} \leq 0$ then P=1

If $C_{ti} > 0$ and $C_{tj} \leq 0$ then P=2

If $C_{ti} \leq 0$ and $C_{tj} > 0$ then P=3

If $C_{ti} > 0$ and $C_{tj} > 0$ then P=4     (6)

An operation of the selection signal output unit 106 will be described below. The selection signal output unit 106 outputs a selection signal SEL=1 to a pixel position where the first virtual prediction image $F_{12}$ should be selected, the selection signal output unit 106 outputs a selection signal SEL=2 to a pixel position where the second virtual prediction image $F_{21}$ should be selected, the selection signal output unit 106 outputs a selection signal SEL=3 to a pixel position where the weighted-summed image should be selected.

Therefore, in each of the patterns (P=1 to 4) shown in FIG. 13, the selection signal SEL=1 is output to the pixel positions in the regions T and Q2, the selection signal SEL=2 is output to the pixel position in the region Q1, and the selection signal SEL=3 is output to the pixel position in the region R.

More specifically, the selection signal output unit 106 outputs selection signals on the basis of the following conditional equations determined for each pattern where a pixel position is represented by (i,j), the number of pixels in a horizontal direction of one frame is represented by I, and the number of pixels in a vertical direction of one frame is represented by J.

(1) Conditional Equations when P=1 (FIG. 13 (a))

if $|C_{ti}| \leq i < I$ and $|C_{tj}| \leq j < J$, then SEL=1 if $0 \leq i < (I-C_{ti})$ and $0 \leq j < |C_{tj}|$ or $0 \leq i < |C_{ti}|$ and $|C_{tj}| \leq j < (J-|C_{tj}|)$, then SEL=2 if $0 \leq i < |C_{ti}|$ and $(J-|C_{tj}|) \leq j < J$ or $(I-|C_{ti}|) \leq i < I$ and $0 \leq j < |C_{tj}|$, then SEL=3

(2) Conditional Equations when P=2 (FIG. 13 (b))

if $0 \leq i < (I-|C_{ti}|)$ and $|C_{tj}| \leq j < J$, then SEL=1 if $|C_{ti}| \leq i < I$ and $0 \leq j < |C_{tj}|$ or $(I-|C_{ti}|) \leq i < I$ and $|C_{tj}| \leq j < (J-|C_{tj}|)$, then SEL=2 if $0 \leq i < |C_{ti}|$ and $0 \leq j < |C_{tj}|$ or $(I-|C_{ti}|) \leq i < I$ and $(J-|C_{tj}|) \leq j < J$, then SEL=3

(3) Conditional Equations when P=3 (FIG. 13 (c))

if $|C_{ti}| \leq i < I$ and $0 \leq j < (J-|C_{ti}|)$, then SEL=1 if $0 \leq i < |C_{ti}|$ and $|C_{tj}| \leq j < J$ or $|C_{ti}| \leq i < (I-|C_{ti}|)$ and $(J-|C_{tj}|) \leq j < J$, then SEL=2 if $0 \leq i < |C_{ti}|$ and $0 \leq j < |C_{tj}|$ or $(I-|C_{ti}|) \leq i < I$ and $(J-|C_{ti}|) \leq j < J$, then SEL=3

(4) Conditional Equations when P=4 (FIG. 13 (d))

if $0 \leq i < (I-|C_{ti}|)$ and $0 \leq j < (J-|C_{tj}|)$, then SEL=1 if $|C_{ti}| \leq i < (I-|C_{ti}|)$ and $(J-|C_{tj}|) \leq j < J$ or $(I-|C_{ti}|) \leq i < I$ and $|C_{tj}| \leq j < J$, then SEL=2 if $0 \leq i < |C_{ti}|$ and $(J-|C_{tj}|) \leq j < J$ or $(I-|C_{ti}|) \leq i < I$ and $0 \leq j < |C_{tj}|$, then SEL=3

When the selector 110 receives the selection signal SEL=1 from the selection signal output unit 106, the selector 110 selects and outputs the first virtual prediction image $F_{12}$. When the selector 110 receives the selection signal SEL=2 from the selection signal output unit 106, the selector 110 selects and outputs the second virtual prediction image $F_{21}$. When the selector 110 receives the selection signal SEL=3 from the selection signal output unit 106, the selector 110 selects and outputs a weighted-summed image. In this manner, a prediction image which is free from a blank portion is generated.

What is claimed is:

1. A frame rate converting apparatus which converts a frame rate of a moving image, comprising:
   a motion detecting module which detects information related to motion of an image for each frame of a moving image to be converted;
   a pan/tilt determining module which determines whether the image is in a pan/tilt state on the basis of the information related to the motion of the image detected by the motion detecting module for each frame of the moving image to be converted;
   a moving distance setting module which sets 0 as a moving distance of an image with respect to a frame the image of which is not determined as an image in a pan/tilt state by the pan/tilt determining module, which calculates a moving distance of an image from the information related to the motion of the image detected by the motion detecting module with respect to a frame the image of which is determined as an image in a pan/tilt state, and which sets the obtained moving distance as a moving distance of the image; and
   a prediction image generating module which generates a prediction image necessary for frame rate conversion on the basis of the moving distance of the image set for each frame by the moving distance setting module.

2. A frame rate converting apparatus which converts a frame rate of a moving image, comprising:
   a motion detecting module which detects information related to motion of an image for each frame of a moving image to be converted;
   a pan/tilt determining module which determines whether the image is in a pan/tilt state on the basis of the information related to the motion of the image detected by the motion detecting module for each frame of the moving image to be converted;
   a moving distance setting module which sets 0 as a moving distance of an image with respect to a frame the image of which is not determined as an image in a pan/tilt state by the pan/tilt determining module, which calculates a moving distance of an image from the information related to the motion of the image detected by the motion detecting module with respect to a frame the image of which is determined as an image in a pan/tilt state, and which sets the obtained moving distance as a moving distance of the image;
   a time-direction smoothing module which smoothes the moving distance of the image set for each frame by the moving distance setting module in a direction of time; and
   a prediction image generating module which generates a prediction image necessary for frame rate conversion on the basis of the moving distance of the image obtained by the time-direction smoothing module.

3. The frame rate converting apparatus according to claim 1, wherein the motion detecting module detects a motion vector, a minimum value of correlative accumulated values, and an average value of the correlative accumulated values as information related to the motion of the image for each of a plurality of motion vector detecting regions set in a video area of each frame by a point matching method, and
   the pan/tilt determining module includes
   a region specifying module which specifies a region in which the detected motion vector has reliability of the motion vector detecting regions on the basis of the average value of the correlative accumulated values detected for each of the motion vector detecting regions and which calculates the number of detection regions in which the detected motion vectors have a predetermined reliability;
   a first determining module which determines whether the number of detection regions in which the detected motion vectors have the predetermined reliability is not less than a first threshold value;
   a second determining module which, when the number of detection regions in which the detected moving vectors have the predetermined reliability is less than the first threshold value, determines that the frame is not panned/tilted;
   a specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;
   a third determining module which determines whether the number of detection regions in which the motions of the plurality of types are present is less than a second threshold value;
   a fourth determining module which, when the number of detection regions in which the motions of the plurality of types are present is not less than the second threshold value, determines that the frame is not panned/tilted; and
   a fifth determining module which, when the number of detection regions in which the motions of the plurality of types are present is less than the second threshold value, determines that the frame is panned/tilted.

4. The frame rate converting apparatus according to claim 2, wherein the motion detecting module detects a motion vector, a minimum value of correlative accumulated values, and an average value of the correlative accumulated values as information related to the motion of the image for each of a plurality of motion vector detecting regions set in a video area of each frame by a point matching method, and
   the pan/tilt determining module includes
   a region specifying module which specifies a region in which the detected motion vector has reliability of the motion vector detecting regions on the basis of the average value of the correlative accumulated values detected for each of the motion vector detecting regions and which calculates the number of detection regions in which the detected motion vectors have a predetermined reliability;
   a first determining module which determines whether the number of detection regions in which the detected motion vectors have the predetermined reliability is not less than a first threshold value;
   a second determining module which, when the number of detection regions in which the detected moving vectors have the predetermined reliability is less than the first threshold value, determines that the frame is not panned/tilted;
   a specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;

a third determining module which determines whether the number of detection regions in which the motions of the plurality of types are present is less than a second threshold value;

a fourth determining module which, when the number of detection regions in which the motions of the plurality of types are present is not less than the second threshold value, determines that the frame is not panned/tilted; and a fifth determining module which, when the number of detection regions in which the motions of the plurality of types are present is less than the second threshold value, determines that the frame is panned/tilted.

5. The frame rate converting apparatus according to claim 1, wherein the motion detecting module detects a motion vector, a minimum value of correlative accumulated values, and an average value of the correlative accumulated values as information related to the motion of the image for each of a plurality of motion vector detecting regions set in a video area of each frame by a point matching method, and the pan/tilt determining module includes:

a region specifying module which specifies a region in which the detected motion vector has reliability of the motion vector detecting regions on the basis of the average value of the correlative accumulated values detected for each of the motion vector detecting regions and which calculates the number of detection regions in which the detected motion vectors have a predetermined reliability;

a first determining module which determines whether the number of detection regions in which the detected motion vectors have the predetermined reliability is not less than a first threshold value;

a second determining module which, when the number of detection regions in which the detected moving vectors have the predetermined reliability is less than the first threshold value, determines that the frame is not panned/tilted;

a first specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;

a third determining module which determines whether the number of detection regions in which the motions of the plurality of types are present is less than a second threshold value;

a fourth determining module which, when the number of detection regions in which the motions of the plurality of types are present is not less than the second threshold value, determines that the frame is not panned/tilted;

a second specifying module which, when the number of detection regions in which the motions of the plurality of types are present is less than the second threshold value, specifies detection regions in which motion vectors have similarity in the detection regions in which the motion vectors have the predetermined reliability and the motions of the plurality of types are not present on the basis of a motion vector detected for the detection region in which the motion vector has the predetermined reliability and the motions of the plurality of types are not present, and which calculates the number of detection regions in which motion vectors have similarity;

a fifth determining module which determines whether the number of detection regions in which motion vectors have similarity is not less than a third threshold value;

a sixth determining module which, when the number of detection regions which are determined as detection regions in which the motion vectors have similarity is less than the third threshold value, determines that the frame is not panned/tilted; and a seventh determining module which, when the number of detection regions which are determined as detection regions in which the motion vectors have similarity is not less than the third threshold value, determines that the frame is panned/tilted.

6. The frame rate converting apparatus according to claim 2, wherein the motion detecting module detects a motion vector, a minimum value of correlative accumulated values, and an average value of the correlative accumulated values as information related to the motion of the image for each of a plurality of motion vector detecting regions set in a video area of each frame by a point matching method, and the pan/tilt determining module includes:

a region specifying module which specifies a region in which the detected motion vector has reliability of the motion vector detecting regions on the basis of the average value of the correlative accumulated values detected for each of the motion vector detecting regions and which calculates the number of detection regions in which the detected motion vectors have a predetermined reliability;

a first determining module which determines whether the number of detection regions in which the detected motion vectors have the predetermined reliability is not less than a first threshold value;

a second determining module which, when the number of detection regions in which the detected moving vectors have the predetermined reliability is less than the first threshold value, determines that the frame is not panned/tilted;

a first specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;

a third determining module which determines whether the number of detection regions in which the motions of the plurality of types are present is less than a second threshold value;

a fourth determining module which, when the number of detection regions in which the motions of the plurality of types are present is not less than the second threshold value, determines that the frame is not panned/tilted;

a second specifying module which, when the number of detection regions in which the motions of the plurality of types are present is less than the second threshold value, specifies detection regions in which motion vectors have similarity in the detection regions in which the motion vectors have the predetermined reliability and the motions of the plurality of types are not present on the basis of a motion vector detected for the detection region in which the motion vector has the predetermined reliability and the motions of the plurality of types are not present, and which calculates the number of detection regions in which motion vectors have similarity;

a fifth determining module which determines whether the number of detection regions in which motion vectors have similarity is not less than a third threshold value;

a sixth determining module which, when the number of detection regions which are determined as detection regions in which the motion vectors have similarity is less than the third threshold value, determines that the frame is not panned/tilted; and a seventh determining module which, when the number of detection regions which are determined as detection regions in which the motion vectors have similarity is not less than the third threshold value, determines that the frame is panned/tilted.

7. A video apparatus having a frame rate converting apparatus which converts a frame rate of a moving image, wherein the frame rate converting apparatus includes:

a motion detecting module which detects information related to motion of an image for each frame of a moving image to be converted;

a pan/tilt determining module which determines whether the image is in a pan/tilt state on the basis of the information related to the motion of the image detected by the motion detecting module for each frame of the moving image to be converted;

a moving distance setting module which sets 0 as a moving distance of an image with respect to a frame the image of which is not determined as an image in a pan/tilt state by the pan/tilt determining module, which calculates a moving distance of an image from the information related to the motion of the image detected by the motion detecting module with respect to a frame the image of which is determined as an image in a pan/tilt state, and which sets the obtained moving distance as a moving distance of the image; and a prediction image generating module which generates a prediction image necessary for frame rate conversion on the basis of the moving distance of the image set for each frame by the moving distance setting module.

8. A video apparatus having a frame rate converting apparatus which converts a frame rate of a moving image, wherein the frame rate converting apparatus includes:

a motion detecting module which detects information related to motion of an image for each frame of a moving image to be converted;

a pan/tilt determining module which determines whether the image is in a pan/tilt state on the basis of the information related to the motion of the image detected by the motion detecting module for each frame of the moving image to be converted;

a moving distance setting module which sets 0 as a moving distance of an image with respect to a frame the image of which is not determined as an image in a pan/tilt state by the pan/tilt determining module, which calculates a moving distance of an image from the information related to the motion of the image detected by the motion detecting module with respect to a frame the image of which is determined as an image in a pan/tilt state, and which sets the obtained moving distance as a moving distance of the image;

a time-direction smoothing module which smooths the moving distance of the image set for each frame by the moving distance setting module in a direction of time; and a prediction image generating module which generates a prediction image necessary for frame rate conversion on the basis of the moving distance of the image obtained by the time-direction smoothing module.

9. A pan/tilt determining apparatus which determines whether an image is in a pan/tilt state for each frame of a moving image, comprising:

a calculating module which calculates a motion vector, a minimum value of correlative accumulated values, and an average value of the correlative accumulated values for each of a plurality of motion vector detecting regions set in a video area of each frame of a moving image by a point matching method;

a first specifying module which specifies a region in which the detected motion vector has a predetermined reliability of the motion vector detecting regions on the basis of the average value of the correlative accumulated values detected for each of the motion vector detecting regions and which calculates the number of detection regions in which the detected motion vectors have the predetermined reliability;

a first determining module which determines whether the number of detection regions in which the detected motion vectors have the predetermined reliability is not less than a first threshold value;

a second determining module which, when the number of detection regions in which the detected moving vectors have the predetermined reliability is less than the first threshold value, determines that the frame is not panned/tilted;

a second specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;

a third determining module which determines whether the number of detection regions in which the motions of the plurality of types are present is less than a second threshold value;

a fourth determining module which, when the number of detection regions in which the motions of the plurality of types are present is not less than the second threshold value, determines that the frame is not panned/tilted; and a fifth determining module which, when the number of detection regions in which the motions of the plurality of types are present is less than the second threshold value, determines that the frame is panned/tilted.

10. A pan/tilt determining apparatus which determines whether an image is in a pan/tilt state for each frame of a moving image, comprising:

a calculating module which calculates a motion vector, a minimum value of correlative accumulated values, and an average value of the correlative accumulated values for each of a plurality of motion vector detecting regions set in a video area of each frame of a moving image by a point matching method;

a first specifying module which specifies a region in which the detected motion vector has a predetermined reliability of the motion vector detecting regions on the basis of the average value of the correlative accumulated values detected for each of the motion vector detecting regions and which calculates the number of detection regions in which the detected motion vectors have the predetermined reliability;

a first determining module which determines whether the number of detection regions in which the detected motion vectors have the predetermined reliability is not less than a first threshold value;

a second determining module which, when the number of detection regions in which the detected moving vectors have the predetermined reliability is less than the first threshold value, determines that the frame is not panned/tilted;

a second specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;

a third determining module which determines whether the number of detection regions in which the motions of the plurality of types are present is less than a second threshold value;

a fourth determining module which, when the number of detection regions in which the motions of the plurality of types are present is not less than the second threshold value, determines that the frame is not panned/tilted;

a third specifying module which, when the number of detection regions in which the motions of the plurality of types are present is less than the second threshold value, specifies detection regions in which motion vectors have similarity in the detection regions in which the motion vectors have the predetermined reliability and the motions of the plurality of types are not present on the basis of a motion vector detected for the detection region in which the motion vector has the predetermined reliability and the motions of the plurality of types are not present, and which calculates the number of detection regions in which motion vectors have similarity;

a fifth determining module which determines whether the number of detection regions in which motion vectors have similarity is not less than a third threshold value;

a sixth determining module which, when the number of detection regions which are determined as detection regions in which the motion vectors have similarity is less than the third threshold value, determines that the frame is not panned/tilted; and a seventh determining module which, when the number of detection regions which are determined as detection regions in which the motion vectors have similarity is not less than the third threshold value, determines that the frame is panned/tilted.

11. A video apparatus having a pan/tilt determining apparatus which determines whether an image is in a pan/tilt state for each frame of a moving image, wherein the pan/tilt determining apparatus includes:

a calculating module which calculates a motion vector, a minimum value of correlative accumulated values, and an average value of the correlative accumulated values for each of a plurality of motion vector detecting regions set in a video area of each frame of a moving image by a point matching method;

a region specifying module which specifies a region in which the detected motion vector has a predetermined reliability of the motion vector detecting regions on the basis of the average value of the correlative accumulated values detected for each of the motion vector detecting regions and which calculates the number of detection regions in which the detected motion vectors have the predetermined reliability;

a first determining module which determines whether the number of detection regions in which the detected motion vectors have the predetermined reliability is not less than a first threshold value;

a second determining module which, when the number of detection regions in which the detected moving vectors have the predetermined reliability is less than the first threshold value, determines that the frame is not panned/tilted;

a specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;

a third determining module which determines whether the number of detection regions in which the motions of the plurality of types are present is less than a second threshold value;

a fourth determining module which, when the number of detection regions in which the motions of the plurality of types are present is not less than the second threshold value, determines that the frame is not panned/tilted; and a fifth determining module which, when the number of detection regions in which the motions of the plurality of types are present is less than the second threshold value, determines that the frame is panned/tilted.

12. A video apparatus having a pan/tilt determining apparatus which determines whether an image is in a pan/tilt state for each frame of a moving image, wherein
the pan/tilt determining apparatus includes:
a calculating module which calculates a motion vector, a minimum value of correlative accumulated values, and an average value of the correlative accumulated values for each of a plurality of motion vector detecting regions set in a video area of each frame of a moving image by a point matching method;
a first specifying module which specifies a region in which the detected motion vector has a predetermined reliability of the motion vector detecting regions on the basis of the average value of the correlative accumulated values detected for each of the motion vector detecting regions and which calculates the number of detection regions in which the detected motion vectors have the predetermined reliability;
a first determining module which determines whether the number of detection regions in which the detected motion vectors have the predetermined reliability is not less than a first threshold value;
a second determining module which, when the number of detection regions in which the detected moving vectors have the predetermined reliability is less than the first threshold value, determines that the frame is not panned/tilted;
a second specifying module which, when the number of detection regions in which the detected motion vectors have the predetermined reliability is not less than the first threshold value, specifies a detection region in which motions of a plurality of types are present and a detection region in which motions of a plurality of types are not present in the detection regions in which the motion vectors have the predetermined reliability on the basis of an average value of correlative accumulated values detected for the detection regions in which the motion vectors have the predetermined reliability and a minimum value of the correlative accumulated values, and which calculates the number of detection regions in which the motions of the plurality of types are present;
a third determining module which determines whether the number of detection regions in which the motions of the plurality of types are present is less than a second threshold value;
a fourth determining module which, when the number of detection regions in which the motions of the plurality of types are present is not less than the second threshold value, determines that the frame is not panned/tilted;
a third specifying module which, when the number of detection regions in which the motions of the plurality of types are present is less than the second threshold value, specifies detection regions in which motion vectors have similarity in the detection regions in which the motion vectors have the predetermined reliability and the motions of the plurality of types are not present on the basis of a motion vector detected for the detection region in which the motion vector has the predetermined reliability and the motions of the plurality of types are not present, and which calculates the number of detection regions in which motion vectors have similarity;
a fifth determining module which determines whether the number of detection regions in which motion vectors have similarity is not less than a third threshold value;
a sixth determining module which, when the number of detection regions which are determined as detection regions in which the motion vectors have similarity is less than the third threshold value, determines that the frame is not panned/tilted; and
a seventh determining module which, when the number of detection regions which are determined as detection regions in which the motion vectors have similarity is not less than the third threshold value, determines that the frame is panned/tilted.

13. A frame rate converting apparatus which converts a frame rate of a moving image, comprising:
a defining module which defines one of two continuous frames in a moving image as a current frame, defines the other as a previous frame, and defines a frame generated between the current frame and the previous frame as a prediction frame, which calculates a shift distance of the prediction image with respect to a previous frame image and a shift distance of the prediction image with respect to a current frame image, on the basis of a moving distance of an image between a previous frame image and a current frame image and a frame rate;
a first shifting module which shifts the previous frame image by using the shift distance of the prediction image with respect to the previous frame image to generate a first virtual prediction image constituted by a first blank portion in which the previous frame image is not present and a first original image portion in which the previous frame image is present;
a second shifting module which shifts the current frame image by using the shift distance of the prediction image with respect to the current frame image to generate a second virtual prediction image constituted by a second blank portion in which the current frame image is not present and a second original image portion in which the current frame image is present; and
a prediction image generating module which generates the prediction image on the basis of the previous frame image, the current frame image, the first virtual prediction image, and the second virtual prediction image, wherein the prediction image generating module, if the first virtual prediction image and the second virtual prediction image are overlapped, generates a prediction image from the second virtual prediction image in a portion where the first blank portion in the first virtual prediction image is overlapped on the second original image portion in the second virtual prediction image, generates a prediction image from the first virtual prediction image in a portion where the second blank portion in the second virtual prediction image is overlapped on the first original image portion in the first virtual prediction image, generates a prediction image by an image obtained by weighted-summing the current frame image and the previous frame image in a portion where the first blank portion and the second blank portion are overlapped, and generates a prediction image from one of the first virtual prediction image and the second virtual prediction image in a portion where the first original image portion in the first virtual prediction image is overlapped on the second original image portion in the second virtual prediction image.

14. A video apparatus having a frame rate converting apparatus which converts a frame rate of a moving image, wherein the frame rate converting apparatus includes:
a defining module which defines one of two continuous frames in a moving image as a current frame, defines the other as a previous frame, and defines a frame generated between the current frame and the previous frames as a prediction frame, which calculates a shift distance of the prediction image with respect to a previous frame image and a shift distance of the prediction image with respect to a current frame image, on the basis of a moving distance of an image between a previous frame image and a current frame image and a frame rate;
a first shifting module which shifts the previous frame image by using the shift distance of the prediction image with respect to the previous frame image to generate a first virtual prediction image constituted by a first blank portion in which the previous frame image is not present and a first original image portion in which the previous frame image is present;
a second shifting module which shifts the current frame image by using the shift distance of the prediction image with respect to the current frame image to generate a second virtual prediction image constituted by a second blank portion in which the current frame image is not present and a second original image portion in which the current frame image is present; and
a prediction image generating module which generates the prediction image on the basis of the previous frame image, the current frame image, the first virtual prediction image, and the second virtual prediction image, wherein the prediction image generating module, if the first virtual prediction image and the second virtual prediction image are overlapped, generates a prediction image from the second virtual prediction image in a portion where the first blank portion in the first virtual prediction image is overlapped on the second original image portion in the second virtual prediction image, generates a prediction image from the first virtual prediction image in a portion where the second blank portion in the second virtual prediction image is overlapped on the first original image portion in the first virtual prediction image, generates a prediction image by an image obtained by weighted-summing the current frame image and the previous frame image in a portion where the first blank portion and the second blank portion are overlapped, and generates a prediction image from one of the first virtual prediction image and the second virtual prediction image in a portion where the first original image portion in the first virtual prediction image is overlapped on the second original image portion in the second virtual prediction image.

* * * * *